US012586886B2

(12) United States Patent
Kim et al.

(10) Patent No.: US 12,586,886 B2
(45) Date of Patent: Mar. 24, 2026

(54) TERAHERTZ DEVICE

(71) Applicant: ROHM CO., LTD., Kyoto (JP)

(72) Inventors: Jaeyoung Kim, Kyoto (JP); Kazuisao Tsuruda, Kyoto (JP); Yosuke Nishida, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 811 days.

(21) Appl. No.: 17/766,927

(22) PCT Filed: Oct. 9, 2020

(86) PCT No.: PCT/JP2020/038252
§ 371 (c)(1),
(2) Date: Jul. 6, 2023

(87) PCT Pub. No.: WO2021/070921
PCT Pub. Date: Apr. 15, 2021

(65) Prior Publication Data

US 2023/0387563 A1 Nov. 30, 2023

(30) Foreign Application Priority Data

Oct. 10, 2019 (JP) ................................ 2019-186699

(51) Int. Cl.
*H01P 3/12* (2006.01)
*H01Q 1/38* (2006.01)
(Continued)

(52) U.S. Cl.
CPC ............... *H01P 3/12* (2013.01); *H01Q 13/02* (2013.01)

(58) Field of Classification Search
CPC .......... H01Q 1/2283; H01Q 1/38; H01Q 9/16; H01Q 23/00; H01Q 9/28; H01Q 15/16;
(Continued)

(56) References Cited

U.S. PATENT DOCUMENTS

2014/0326890 A1* 11/2014 Debray .................... G01J 3/42 250/349
2018/0066981 A1* 3/2018 Mukai .................... H10F 30/10
2020/0279776 A1 9/2020 Mukai et al.

FOREIGN PATENT DOCUMENTS

JP 2008268164 11/2008
JP 2017143347 8/2017
(Continued)

OTHER PUBLICATIONS

Second Office Action issued for Chinese Patent Application No. 202080069429.X, dated Jun. 8, 2023, 17 pages including partial English machine translation.
(Continued)

*Primary Examiner* — Wei (Victor) Y Chan
(74) *Attorney, Agent, or Firm* — HSML.P.C.

(57) ABSTRACT

A terahertz device includes a terahertz element that allows oscillation and radiation of electromagnetic waves in the terahertz band and a waveguide having a transmission region for transmitting electromagnetic waves. The terahertz element has an element principal surface and an element rear surface which face oppositely, an oscillation point for the oscillation of electromagnetic waves on the element principal surface, and a radiation point for the radiation of electromagnetic waves. The terahertz element is disposed such that the oscillation point and the radiation point are placed in the transmission region.

15 Claims, 29 Drawing Sheets

(51) Int. Cl.
*H01Q 9/16* (2006.01)
*H01Q 13/02* (2006.01)
(58) Field of Classification Search
CPC ........ H01Q 19/13; H01Q 1/36; H01Q 9/0457; H01Q 9/24; H01Q 1/40; H01Q 13/085
See application file for complete search history.

(56) References Cited

FOREIGN PATENT DOCUMENTS

| | | | |
|---|---|---|---|
| JP | 2019075544 | A | 5/2019 |
| WO | 2019077994 | | 4/2019 |

OTHER PUBLICATIONS

First Office Action issued for Chinese Patent Application No. 202080069429.X, dated Dec. 13, 2022, 20 pages including English translation.
Matsumoto, H. et al., "Waveguide Coupling of Resonant-Tunneling Diode Terahertz Oscillator," 2018 43rd International Conference On Infrared and Millimeter Waves, IEEE, 2018, 1 page.
International Search Report and Written Opinion issued for International Patent Application No. PCT/JP2020/038252, Date of mailing: Dec. 1, 2020, 9 pages including English translation of Search Report.
Notice of Reasons for Refusal issued for Japanese Patent Application No. 2021-551711, Dispatch date: Aug. 13, 2024, 7 pages including English machine translation.

* cited by examiner

TERAHERTZ DEVICE

TECHNICAL FIELD

The present disclosure relates to a terahertz device.

BACKGROUND ART

A low-loss hollow waveguide is usually used to propagate a signal on a high-frequency wave that is greater than, for example, a millimeter wave. A semiconductor chip that generates an electric signal on a high-frequency wave is accommodated in a cavity arranged outside the waveguide and is connected to a transmission line having a distal end inserted into the waveguide. A high-frequency electric signal is transmitted from the semiconductor chip through the transmission line to an antenna at the distal end of the transmission line and sent out of the antenna as an electromagnetic wave (for example, refer to patent document 1).

CITATION LIST

Patent Literature

Patent Literature 1: Japanese Laid-Open Patent Publication No. 2017-143347

SUMMARY OF INVENTION

Technical Problem

In a configuration such as that described above, signal attenuation may occur in the transmission line and lower the coupling efficiency with respect to the waveguide.

It is an objective of the present invention to provide a terahertz device that obtains a high coupling efficiency.

Solution to Problem

One aspect of the present disclosure is a terahertz device including a terahertz element that generates and emits electromagnetic waves in a terahertz band, and a waveguide including a transmission region that transmits the electromagnetic waves. The terahertz element includes an element main surface and an element back surface that face opposite directions, and the element main surface includes a generating point that generates the electromagnetic waves and an emitting point that emits the electromagnetic waves. The terahertz element is arranged so that the generating point and the emitting point are located in the transmission region.

This configuration arranges the generating point and the emitting point of the terahertz element in the transmission region. Thus, the electromagnetic waves are directly emitted into the transmission region of the waveguide from the terahertz element. This obtains a high coupling efficiency between the waveguide and the terahertz element.

One aspect of the present disclosure is a terahertz device including a waveguide including a transmission region that transmits electromagnetic waves in a terahertz band, and a terahertz element that receives and detects the electromagnetic waves. The terahertz element includes an element main surface and an element back surface that face opposite directions. The element main surface includes a receiving point that receives the electromagnetic waves and a detecting point that detects the electromagnetic waves. The terahertz element is arranged so that the receiving point and the detecting point are located in the transmission region.

This configuration arranges the receiving point and the detecting point of the terahertz element in the transmission region. Thus, the electromagnetic waves propagated through the waveguide are directly received and detected by the terahertz element. This obtains a high coupling efficiency between the waveguide and the terahertz element.

Advantageous Effects of Invention

The terahertz device according to one aspect of the present disclosure obtains a high coupling efficiency in the waveguide and the terahertz element.

DESCRIPTION OF EMBODIMENTS

Embodiments and modified examples will hereafter be described with reference to the drawings. The embodiments and modified examples described below exemplify configurations and methods for embodying a technical concept and are not intended to limit the material, shape, structure, arrangement, dimensions, and the like of each component to the description. The embodiments and modified examples described below may undergo various modifications. The present embodiment and the following modifications can be combined as long as there is no technical contradiction.

First Embodiment

A first embodiment will now be described.

Figure 1:
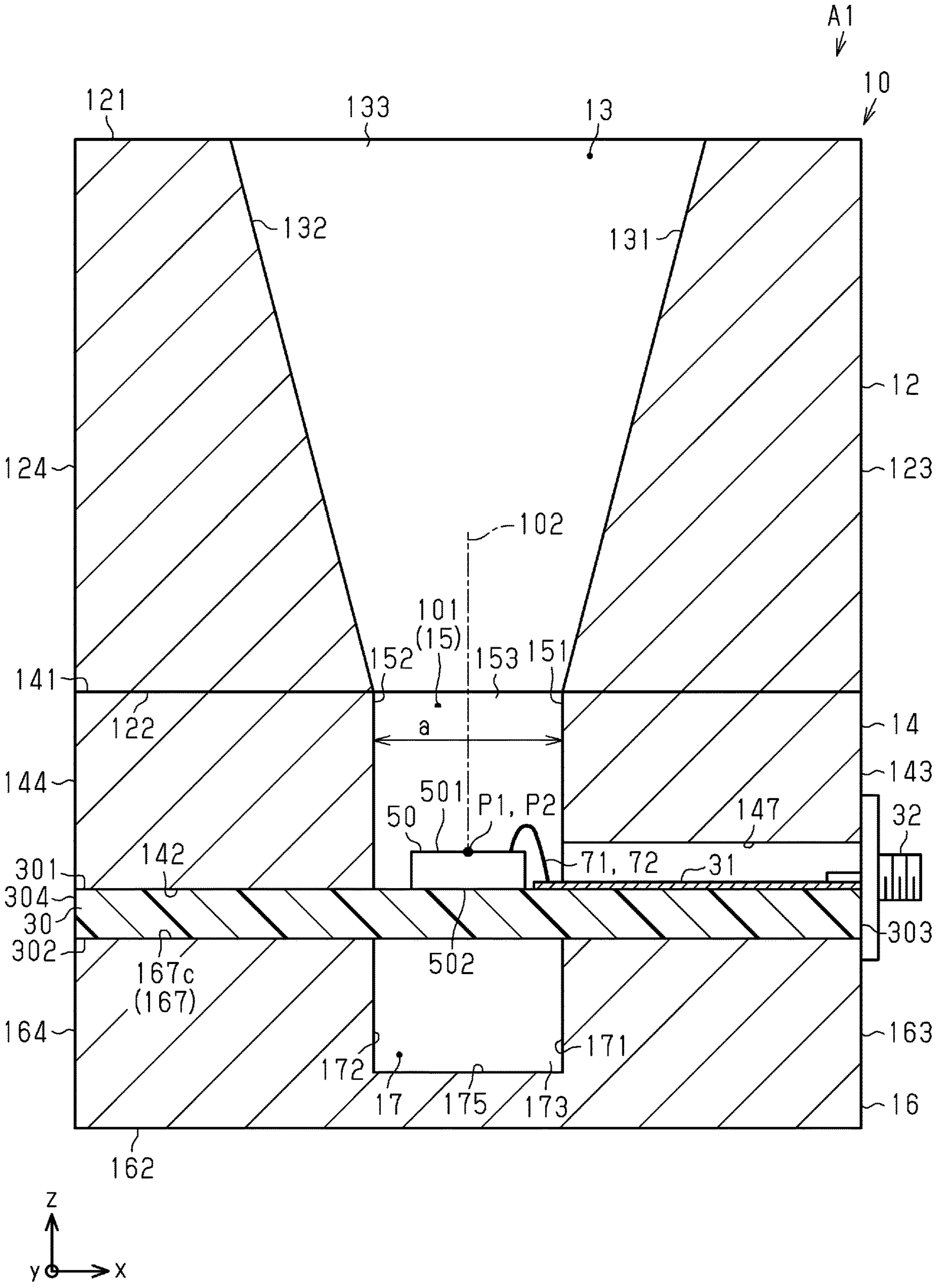
FIG. 1 is a cross-sectional front view showing a terahertz device in accordance with a first embodiment.
Figure 2:
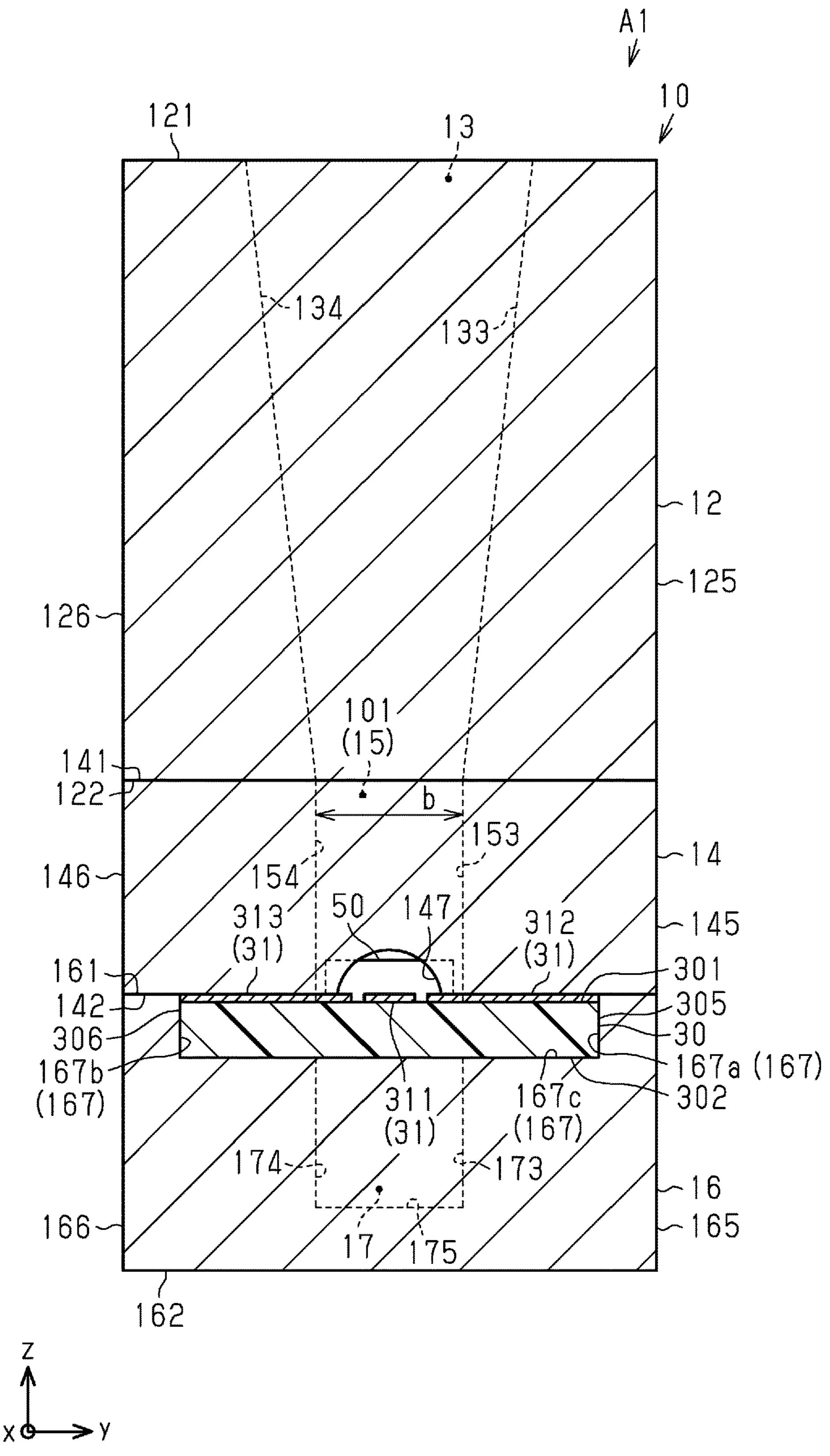
FIG. 2 is a cross-sectional side showing the terahertz device in accordance with the first embodiment.

FIGS. 1 and 2 show a terahertz device A1 in accordance with a first embodiment. The terahertz device A1 includes a waveguide 10, a support substrate 30, and a terahertz element 50.

The waveguide 10 is a hollow metal pipe that transmits electromagnetic waves. The waveguide 10 is, for example, a quadrangular waveguide.

The terahertz element 50 is an element that converts electromagnetic waves in the terahertz band into electric energy. Electromagnetic waves include the concept of one or both of light and radio waves. The terahertz element 50 generates electromagnetic waves in the terahertz band by converting the supplied electric energy. Consequently, the terahertz element 50 emits electromagnetic waves in the terahertz band, namely, terahertz waves. The frequency of electromagnetic waves is, for example, 0.1 Thz to 10 Thz. Further, the terahertz element 50 receives electromagnetic waves in the terahertz band and converts the electromagnetic waves into electric energy. This allows the terahertz element 50 to detect terahertz waves.

The terahertz element 50 is arranged in the waveguide 10. The disclosed terahertz device A1 includes the waveguide 10 that transmits electromagnetic waves and the terahertz element 50 that is coupled to the waveguide 10. For the sake of convenience, the transmission direction of electromagnetic waves in the waveguide 10 will be referred to as the first direction z. The first direction z is a direction in which a transmission region 101 of the waveguide 10 extends. Further, directions orthogonal to each other and to the first direction z will be referred to as the second direction x and the third direction y.

The waveguide 10 includes an antenna 12, a main body 14, and a short-circuit portion 16.

As viewed in the first direction z, the main body 14 has a rectangular contour having a closed shape with a through hole 15 extending through its central part. The main body 14 is formed from a conductive material that is non-transmissive with respect to electromagnetic waves emitted from and received by the terahertz element 50. The material may be a metal, such as copper (Cu), a Cu alloy, aluminum (Al), or an Al alloy, and plated with gold.

The main body 14 includes a main surface 141, a back surface 142, and outer side surfaces 143, 144, 145, and 146. The main surface 141 and the back surface 142 face opposite directions with respect to the first direction z. The outer side surfaces 143 and 144 face opposite directions with respect to the second direction x. As shown in FIG. 2, the outer side surfaces 145 and 146 face opposite directions with respect to the third direction y. The main surface 141 and the back surface 142 are orthogonal to each of the outer side surfaces 143 to 146.

Figure 3:
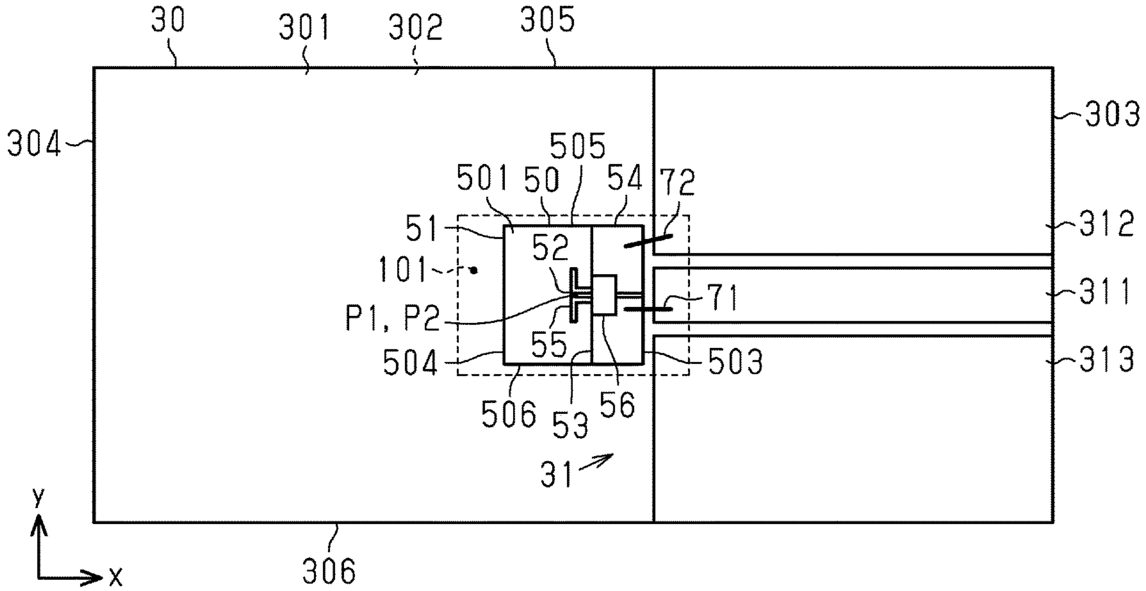
FIG. 3 is a plan view showing a support substrate and a terahertz element of the first embodiment.
Figure 14:
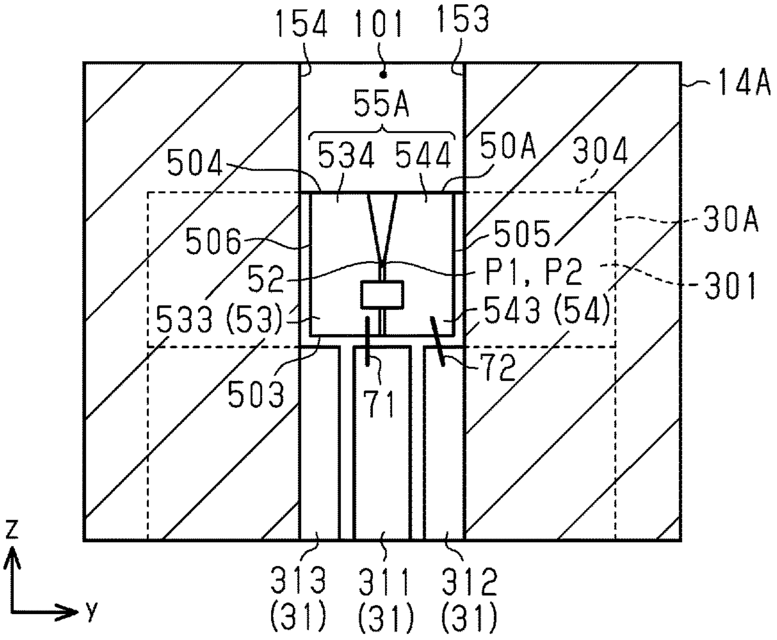
FIG. 14 is a cross-sectional side view showing the terahertz device in accordance with the third embodiment.

As shown in FIGS. 1 and 2, the main body 14 includes the through hole 15. The through hole 15 extends through the main body 14 from the main surface 141 of the main body 14 to the back surface 142. The through hole 15 defines the inner side surfaces 151, 152, 153, and 154. The inner side surfaces 151 and 152 face opposite directions with respect to the second direction x. As shown in FIG. 2, the inner side surfaces 153 and 154 face opposite directions with respect to the third direction y. The through hole 15 functions as the transmission region 101 that transmits the electromagnetic waves. Therefore, in the description hereafter, the through hole 15 will be referred to as the transmission region 101. The transmission region 101 is defined by the inner side surfaces 151 to 154 of the main body 14. As shown in FIGS. 3 and 14, the transmission region 101 is rectangular as viewed in the first direction z. Thus, the waveguide 10 of the present embodiment is a quadrangular waveguide.

As shown in FIGS. 1 and 2, dimension a of the transmission region 101 in the second direction x and dimension b of the transmission region 101 in the third direction y, that is, the distance between the inner side surfaces 151 and 152 and the distance between the inner side surfaces 153 and 154, are determined by the mode of the waveguide 10. In the present embodiment, dimension a of the transmission region 101 in the second direction x is greater than dimension b of the transmission region 101 in the third direction y. Thus, the transmission region 101 of the present embodiment is rectangular and has long sides extending in the second direction x and short sides extending in the third direction y. The mode of the waveguide 10 is, for example, the TE10 mode. The mode of the waveguide 10 may be changed.

The main body 14 includes a groove 147. The groove 147 is recessed from the back surface 142 of the main body 14 toward the main surface 141. The groove 147 extends from the outer side surface 143 of the main body 14 to the inner side surface 151. The groove 147 has, for example, a semi-circular cross section as viewed in the second direction x. The groove 147 extends along a main conductor 311 of a power feed line 31 that is arranged on the support substrate 30 and formed to surround the main conductor 311. Thus, the main body 14 does not contact the main conductor 311. As long as the main conductor 311 does not contact the main body 14, the groove 147 may have any cross-sectional shape such as a quadrangular shape or a triangular shape.

The short-circuit portion 16 is attached to the back surface 142 of the main body 14. The short-circuit portion 16 is formed from a conductive material that is non-transmissive with respect to electromagnetic waves emitted from and received by the terahertz element 50. The material may be a metal, such as Cu, a Cu alloy, Al, or an Al alloy, and plated with gold.

The short-circuit portion 16 has the form of a rectangular parallelepiped. The short-circuit portion 16 includes a main surface 161, a back surface 162, and outer side surfaces 163, 164, 165, and 166. The main surface 161 and the back surface 162 face opposite directions with respect to the first direction z. The outer side surfaces 163 and 164 face opposite directions with respect to the second direction x. As shown in FIG. 2, the outer side surfaces 165 and 166 face opposite directions in the third direction y.

The main surface 161 of the short-circuit portion 16 is attached to the back surface 142 of the main body 14 facing the back surface 142. The short-circuit portion 16 is connected to the main body 14 by, for example, a conductive adhesive, a flange, or the like. The short-circuit portion 16 and the main body 14 may be connected to each other as an integrated body.

The short-circuit portion 16 closes one side of the transmission region 101 that extends through the main body 14. Consequently, the transmission region 101 of the waveguide 10 serves as a waveguide passage having one end that is open and another end that is short-circuited.

As shown in FIGS. 1 and 2, the short-circuit portion 16 includes a substrate accommodation recess 167 corresponding to the support substrate 30. As shown in FIG. 1, the substrate accommodation recess 167 extends in the second direction x from the outer side surface 163 of the short-circuit portion 16 to the outer side surface 164. Although the dimension of the support substrate 30 in the second direction x is equal to the dimension of the short-circuit portion 16 in the second direction x, the dimension of the support substrate 30 in the second direction x may be changed as long as the support substrate 30 allows the generating point P1 and the emitting point P2 of the terahertz element 50 to be located in the transmission region 101 of the waveguide 10. The substrate accommodation recess 167 of the short-circuit portion 16 only has to extend from the outer side surface 163 toward the outer side surface 164 over the dimension of the support substrate 30 so as to accommodate the support substrate 30.

As shown in FIG. 2, the substrate accommodation recess 167 is defined by wall surfaces 167*a* and 167*b* and a bottom surface 167*c*. As shown in FIG. 2, the wall surfaces 167*a* and 167*b* face each other in the third direction y. The bottom surface 167*c* faces the main body 14 in the first direction z. The substrate accommodation recess 167 may be included in the main body 14.

As shown in FIGS. 1 and 2, the short-circuit portion 16 includes a back short portion 17. The back short portion 17 is a recess defined by inner side surfaces 171, 172, 173, and 174 and a bottom surface 175 that are formed in the short-circuit portion 16. The inner side surfaces 171 and 172 face opposite directions with respect to the second direction x. As shown in FIG. 2, the inner side surfaces 173 and 174 face opposite directions with respect to the third direction y. The bottom surface 175 faces the main body 14 in the first direction z. In the first embodiment, as viewed in the first direction z, the inner side surfaces 171 to 174 of the back short portion 17 are located at positions corresponding to the inner side surfaces 151 to 154 defining the transmission region 101 of the main body 14. Thus, the back short portion 17 has the same size as the transmission region 101 as viewed in the first direction z.

As shown in FIGS. 1 and 2, the antenna 12 is arranged on the main body 14 at the side opposite to the short-circuit portion 16. The antenna 12 is formed from a conductive material that is non-transmissive with respect to electromagnetic waves emitted from the terahertz element 50. The material may be a metal, such as Cu, a Cu alloy, Al, or an Al alloy, and plated with gold.

The antenna 12 includes a main surface 121, a back surface 122, and outer side surfaces 123, 124, 125, and 126. The main surface 121 and the back surface 122 face opposite directions with respect to the first direction z. The outer side surfaces 123 and 124 face opposite directions with respect to the second direction x. As shown in FIG. 2, the outer side surfaces 125 and 126 face opposite directions with respect to the third direction y. The main surface 121 and the back surface 122 are orthogonal to each of the outer side surfaces 123 to 126.

The antenna 12 includes a through hole 13 extending from the main surface 121 to the back surface 122. The through hole 13 is defined by inner side surfaces 131, 132, 133, and 134. The inner side surfaces 131 and 132 face the second direction x, and the inner side surfaces 133 and 134 face the third direction y.

The back surface 122 of the antenna 12 that faces the main surface 141 of the main body 14 is connected to the main surface 141. The antenna 12 and the main body 14 are connected to each other by, for example, using a conductive adhesive or their flanges. The antenna 12 and the main body 14 may be connected to each other as an integrated body.

The opening size of the through hole 13 at the back surface 122 of the antenna 12 is equal to the opening size of the transmission region 101 at the main surface 141 of the main body 14. The inner side surfaces 131 and 132, which define the through hole 13, are inclined so that the distance therebetween increases from the back surface 122 of the antenna 12 toward the main surface 121. As shown in FIG. 2, the inner side surfaces 133 and 134, which define the through hole 13, are inclined so that the distance therebetween increases from the back surface 122 of the antenna 12 toward the main surface 121. The antenna 12 functions as a horn antenna. The antenna 12 may be omitted.

As shown in FIGS. 1 and 2, the support substrate 30 is located between the main body 14 and the short-circuit portion 16. As shown in FIG. 2, in the present embodiment, the support substrate 30 is arranged in the substrate accommodation recess 167 of the short-circuit portion 16.

The support substrate 30 is formed from a conductive material that is non-transmissive with respect to the electromagnetic waves emitted from the terahertz element 50 or the electromagnetic waves received by the terahertz element 50. In the present embodiment, the support substrate 30 is formed by a dielectric. The dielectric may be, for example, glass such as fused quartz, sapphire, a synthetic resin such as epoxy resin, or a monocrystalline intrinsic semiconductor such as silicon (Si). Fused quartz is used in the present embodiment.

As shown in FIGS. 1 and 2, the support substrate 30 includes a substrate main surface 301, a substrate back surface 302, and substrate side surfaces 303, 304, 305, and 306.

The substrate main surface 301 and the substrate back surface 302 face opposite directions with respect to the first direction z. The substrate side surfaces 303 and 304 face opposite directions with respect to the second direction x. As shown in FIG. 2, the substrate side surfaces 305 and 306 face opposite directions with respect to the third direction y. The support substrate 30 is attached to the short-circuit portion 16 with the substrate main surface 301 facing the main body 14, and the substrate side surfaces 305 and 306 and substrate back surface 302 respectively facing, in contact with or through an intermediate layer of an adhesive or the like, the wall surfaces 167*a* and 167*b* and the bottom surface 167*c* in the substrate accommodation recess 167 of the short-circuit portion 16. Thus, the support substrate 30 is attached to the waveguide 10 so that the substrate main surface 301 and the substrate back surface 302 are orthogonal to the center axis 102 of the waveguide 10. The center axis 102 is the center of the transmission region 101 in the main body 14 of the waveguide 10 as viewed in the first direction z.

The support substrate 30 includes the power feed line 31 that acts as a transmission line connected to the terahertz element 50. The power feed line 31 of the present embodiment is a coplanar line. The power feed line 31 may also be a microstrip line, a strip line, a slot line, or the like.

As shown in FIG. 3, the power feed line 31 of the present embodiment includes the main conductor 311 and ground conductors 312 and 313 that are formed on the support substrate 30. The main conductor 311 extends in the second direction x. The ground conductors 312 and 313 are arranged at opposite sides of the main conductor 311. The main conductor 311 and the ground conductors 312 and 313 are formed from, for example, Cu. The main conductor 311 is connected to a core wire of a connector 32 arranged on the substrate side surface 303 of the support substrate 30. The connector 32 allows for transmission of high-frequency signals and is, for example, an SMA connector. The housing of the connector 32 is connected to the main body 14 of the waveguide 10. The ground conductors 312 and 313 are in contact with the back surface 142 of the main body 14 in the waveguide 10 and electrically connected to the main body 14.

As shown in FIGS. 1 and 2, the terahertz element 50 has the form of a rectangular plate as viewed in the first direction z. The terahertz element 50 is, for example, square as viewed in the first direction z. The terahertz element 50 does not have to be rectangular and may be circular, elliptic, or polygonal.

The terahertz element 50 includes an element main surface 501, an element back surface 502, and the element side surfaces 503, 504, 505, and 506. The element main surface 501 and the element back surface 502 face opposite directions with respect to the thickness direction of the terahertz element 50.

As shown in FIGS. 1 to 4, the terahertz element 50 is mounted on the support substrate 30. The terahertz element 50 of the present embodiment is attached to the support substrate 30 with the element back surface 502 facing, in contact with or through an intermediate layer, the substrate main surface 301.

The terahertz element 50 includes an emission pattern that emits electromagnetic waves in a direction orthogonal to the element main surface 501 and the element back surface 502, namely, the first direction z that is the thickness direction of the terahertz element 50. The support substrate 30 of the present embodiment is attached to the waveguide 10 in correspondence with the emission pattern of the terahertz element 50 so that the emission direction of electromagnetic waves at the terahertz element 50 is parallel to the center axis 102 of the waveguide 10.

In FIGS. 1 and 2, the thickness direction of the terahertz element 50 coincides with the first direction z. In other words, the terahertz element 50 of the present embodiment is arranged so that the direction orthogonal to the element main surface 501, namely, the thickness direction of the terahertz element 50, coincides with the direction in which electromagnetic waves are propagated in the waveguide 10 (first direction z). The second direction x is orthogonal to the first direction z, and the third direction y is orthogonal to the first direction z and the second direction x. For the sake of convenience, the terahertz element 50 will be described using the first direction z, the second direction x, and the third direction y.

The element main surface 501 and the element back surface 502 intersect the first direction z and are orthogonal to the first direction z in the present embodiment. As viewed in the first direction z, the element main surface 501 and the element back surface 502 are tetragonal, for example, square. The element main surface 501 and the element back surface 502 are not limited in shape and may have any shape.

The element side surfaces 503 and 504 face opposite directions in the second direction x, which is orthogonal to the thickness direction. The element side surfaces 503 and 504 intersect the second direction x and are orthogonal to the second direction x in the present embodiment. The element side surfaces 505 and 506 face opposite directions with respect to the third direction y. The element side surfaces 505 and 506 intersect the third direction y and are orthogonal to the third direction y in the present embodiment.

Figure 5:
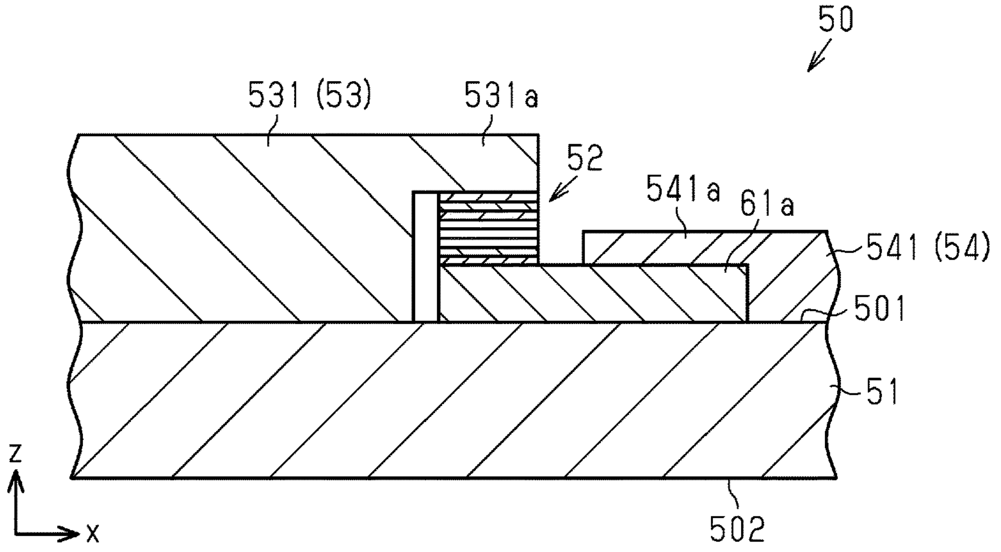
FIG. 5 is an end elevational view schematically showing an active element.
Figure 6:
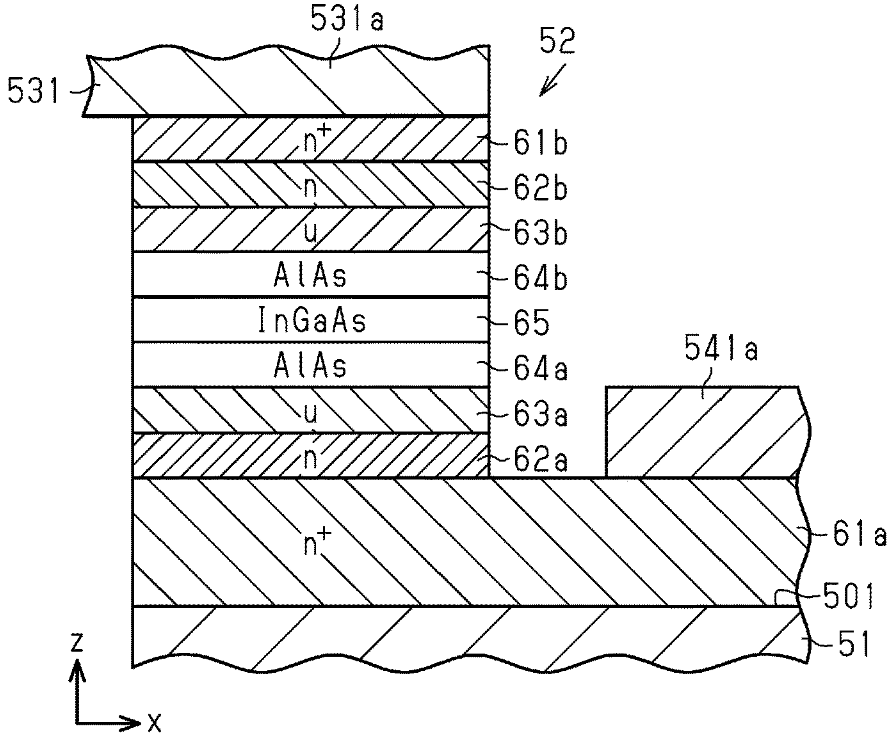
FIG. 6 is an enlarged end elevational view showing the cross-sectional structure of the active element.

FIGS. 5 and 6 show the configuration of the terahertz element 50 in detail. FIG. 5 is a schematic cross-sectional view of the terahertz element 50. FIG. 6 is a partially enlarged view of FIG. 5.

As shown in FIGS. 5 and 6, the terahertz element 50 includes an element substrate 51, an active element 52, a first conductor layer 53, and a second conductor layer 54.

The element substrate 51 is semi-insulative and formed by a semiconductor. The semiconductor forming the element substrate 51 is, for example, indium phosphide (InP) but may be a semiconductor other than InP. When the element substrate 51 is InP, its refractive index (absolute refractive index) is approximately 3.4. In the present embodiment, the element substrate 51 has the form of a rectangular plate and is, for example, square in plan view. The element main surface 501 and the element back surface 502 are the main surface and the back surface of the element substrate 51. The element side surfaces 503, 504, 505, and 506 are the side surfaces of the element substrate 51.

The active element 52 performs conversion between electromagnetic waves in the terahertz band and electric energy. The active element 52 is arranged on the element substrate 51. In the present embodiment, the active element 52 is arranged in the center of the element main surface 501. The active element 52 is connected to an antenna 55 to convert the supplied electric energy into electromagnetic waves in the terahertz band. Consequently, the terahertz element 50 emits electromagnetic waves in the terahertz band (terahertz waves). Accordingly, the active element 52 may be referred to as the generating point P1 that generates terahertz waves, and the antenna 55 may be referred to as the emitting point P2 that emits terahertz waves. The terahertz element 50 of the present embodiment includes the emitting point P2 in the center of the element main surface 501. In the present embodiment, the terahertz element 50 includes the emitting point P2 and the generating point P1 at the same position.

The active element 52 is typically a resonant tunneling diode (RTD). The active element 52 may be, for example, a tunnel injection transit time (TUNNETT) diode, an impact ionization avalanche transit time (IMPATT) diode, a GaAs field effect transistor (FET), a GaN FET, a high electron mobility transistor (HEMT), or a heterojunction bipolar transistor (HEMT).

One example of the active element 52 will now be described.

A semiconductor layer 61*a* is formed on the element substrate 51. The semiconductor layer 61*a* is formed from, for example, GaInAs. The semiconductor layer 61*a* is heavily doped with an n-type impurity.

A GaInAs layer 62*a* is formed on the semiconductor layer 61*a*. The GaInAs layer 62*a* is doped with an n-type impurity. For example, the GaInAs layer 62*a* has a lower impurity concentration than the semiconductor layer 61*a*.

A GaInAs layer 63*a* is formed on the GaInAs layer 62*a*. The GaInAs layer 63*a* is not doped with an impurity.

An AlAs layer 64*a* is formed on the GaInAs layer 63*a*. An InGaAs layer 65 is formed on the AlAs layer 64*a*. An AlAs layer 64*b* is formed on the InGaAs layer 65. The AlAs layer 64*a*, the InGaAs layer 65, and the AlAs layer 64*b* form a resonant tunneling portion.

A GaInAs layer 63*b* that is not doped with an impurity is formed on the AlAs layer 64*b*. A GaInAs layer 62*b* that is doped with an n-type impurity is formed on the GaInAs layer 63*b*. A GaInAs layer 61*b* is formed on the GaInAs layer 62*b*. The GaInAs layer 61*b* is heavily doped with an n-type impurity. For example, the GaInAs layer 61*b* has a higher impurity than the GaInAs layer 62*b*.

The active element 52 may have any construction as long as electromagnetic waves can be generated (or detected or generated and detected). That is, the active element 52 need only perform one of generation and detection of electromagnetic waves in the terahertz band.

As shown in FIG. 5, the terahertz element 50 includes the generating point P1 that generates electromagnetic waves. The generating point P1 is on the element main surface 501. The element main surface 501 including the generating point P1 acts as an active surface. Further, the generating point P1 is located at where the active element 52 is arranged.

The emitting point P2 (antenna 55) is located at the center of the element main surface 501. However, the position of the emitting point P2, that is, the position of the antenna 55 relative to the element main surface 501, is not limited to the center of the element main surface 501 and may be changed. Further, the position of the generating point P1 (active element 52) does not have to be the same as the emitting point P2 and may be changed.

Figure 4:
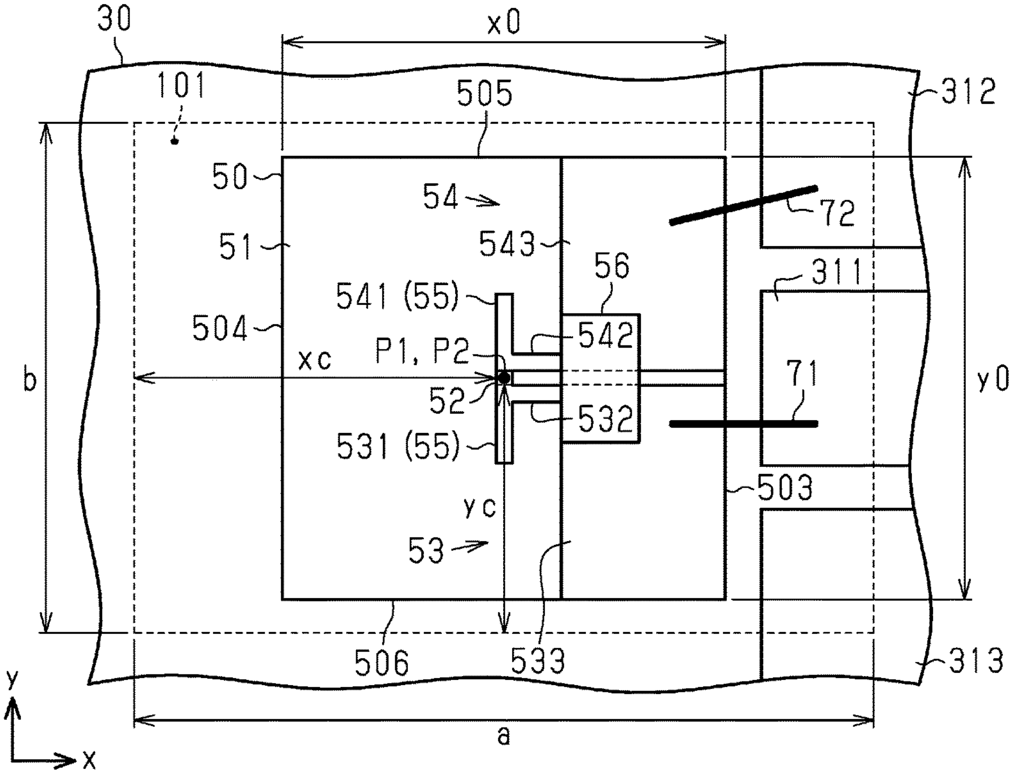
FIG. 4 is a partially enlarged plan view of FIG. 3.

As shown in FIGS. 3 and 4, the first conductor layer 53 and the second conductor layer 54 are each formed on the element main surface 501. The first conductor layer 53 and the second conductor layer 54 are insulated from each other. The first conductor layer 53 and the second conductor layer 54 each have a metal stack structure. The stack structure of each of the first conductor layer 53 and the second conductor layer 54 is formed by stacking, for example, gold (Au), palladium (Pd), and titanium (Ti). Alternatively, the stack structure of each of the first conductor layer 53 and the second conductor layer 54 is formed by stacking Au and Ti. The first conductor layer 53 and the second conductor layer 54 are each formed through vacuum evaporation or sputtering.

As shown in FIG. 4, the first conductor layer 53 includes a first conductive portion 531, a first connecting portion 532, and a first pad electrode 533. The second conductor layer 54 includes a second conductive portion 541, a second connecting portion 542, and a second pad electrode 543.

The first conductive portion 531 and the second conductive portion 541 extend in opposite directions from the active element 52 with respect to the direction orthogonal to the element side surfaces 505 and 506 of the terahertz element 50 (third direction y). Thus, the first conductive portion 531 and the second conductive portion 541 are parallel to the element side surfaces 503 and 504 of the terahertz element 50. As shown in FIGS. 3 and 4, the transmission region 101 is rectangular as viewed in the first direction z. In the present embodiment, the first conductive portion 531 and the second conductive portion 541 extend in the direction of the short sides of the transmission region 101 in the terahertz element 50, which is arranged in the transmission region 101.

The first conductive portion 531 and the second conductive portion 541 function as the antenna 55. The terahertz element 50 includes the antenna 55 that integrates the first conductive portion 531, which is part of the first conductor layer 53, and the second conductive portion 541, which is part of the second conductor layer 54, on the element main surface 501. Thus, the terahertz element 50 includes the active element 52, which generates and detects electromagnetic waves having a terahertz band frequency, and the antenna 55, which has an emission pattern in a direction orthogonal to the element main surface 501 and emits and receives electromagnetic waves.

The antenna 55 is, for example, a dipole antenna. The length from the distal end of the first conductive portion 531 to the distal end of the second conductive portion 541, that is, the antenna length, is ½·wavelength (λ/2) of the electromagnetic waves emitted from the terahertz element 50. The antenna is not limited to a dipole antenna and may another type of antenna such as a bowtie antenna, a slot antenna, a patch antenna, or a ring antenna. The antenna length may be changed in accordance with the antenna configuration.

The first connecting portion 532 extends in the second direction x and connects the first conductive portion 531 and the first pad electrode 533. The second connecting portion 542 extends in the second direction x and connects the second conductive portion 541 and the second pad electrode 543. The first pad electrode 533 and the second pad electrode 543 are spaced apart in the third direction y and insulated from each other.

The terahertz element 50 of the present embodiment includes a metal insulator metal (MIM) reflector 56. The MIM reflector 56 has a stack structure of metal/insulator/metal. The MIM reflector 56 is formed so that, for example, an insulator is sandwiched between part of the first pad electrode 533 and part of the second pad electrode 543 in the thickness direction of the terahertz element 50. The insulator may be, for example, an $SiO_2$ film, a $Si_3N_4$ film, a SiON film, an $HfO_2$ film, an $Al_2O_3$ film, or the like.

The MIM reflector 56 short-circuits, at a high frequency, the first conductor layer 53 and the second conductor layer 54. The MIM reflector 56 can reflect high-frequency electromagnetic waves. The MIM reflector 56 functions as a low-pass filter. The MIM reflector 56 is not essential, and the MIM reflector 56 may be omitted.

As shown in FIGS. 5 and 6, in the present embodiment, the first conductive portion 531 and the second conductive portion 541 are located at opposite sides of the active element 52 in the third direction y. The first conductive portion 531 includes a first connection region 531*a* overlapped with the active element 52 in the first direction z. The first connection region 531*a* is located on the GaInAs layer 61*b* and in contact with the GaInAs layer 61*b*.

As shown in FIG. 5, the semiconductor layer 61*a* extends from the other layers, such as the GaInAs layer 62*a*, toward the second conductor layer 54 in the second direction x. As shown in FIGS. 5 and 6, the second conductive portion 541 includes a second connection region 541*a* formed on the portion of the semiconductor layer 61*a* where the GaInAs layer 62a and the like is not stacked. Thus, the active element 52 is electrically connected to the first conductive portion 531 and the second conductive portion 541. The second connection region 541a is spaced apart in the second direction x from the other layers such as the GaInAs layer 62a.

Although not shown in the drawings, instead of the structure shown in FIG. 6, a GaInAs layer heavily doped with an n-type impurity may be arranged between the GaInAs layer 61b and the first connection region 531a. This will allow for satisfactory contact between the first conductive portion 531 and the GaInAs layer 61b.

As shown in FIGS. 3 and 4, the first pad electrode 533 is electrically connected by a wire 71 to the main conductor 311 of the support substrate 30. Further, the second pad electrode 543 is electrically connected by a wire 72 to the ground conductor 312 of the support substrate 30. The wires 71 and 72 are formed from, for example, gold (Au). The first pad electrode 533 may be connected to the ground conductor 313, and the second pad electrode 543 may be connected to the main conductor 311. There may be more than one of each of the wires 71 and 72. The number of the wires 71 may differ from the number of the wires 72.

FIG. 4 shows the relationship of the transmission region 101 and the terahertz element 50 in the waveguide 10.

The terahertz element 50 has a dimension in the second direction x denoted by x0 and a dimension in the third direction y denoted by y0. Dimension x0 and dimension y0 are set in correspondence with a dielectric resonator antenna.

In the present embodiment, the emitting point P2 is set in the center of the terahertz element 50. When x1 represents the distance from the emitting point P2 to the element side surface 504, distance x1 is ½ of element dimension x0. Preferably, distance x1 (=x0/2) is ((λ1/2)+((λ1/2)×N (where N is an integer greater than or equal to 0: N=0, 1, 2, 3, . . . )). Here, λ1 represents the effective wavelength of the electromagnetic waves transmitted through the terahertz element 50 (element substrate 51). When n1 represents the refractive index of the terahertz element 50 (element substrate 51), c represents the speed of light, and fc represents the center frequency of electromagnetic waves, λ1 is (1/n1)×(c/fc). In the same manner, when y1 represents the distance from the emitting point P2 to the element side surface 506, distance y1 is ½ of element distance y0. Preferably, y1 (=y0/2) is (λ1/2)+((λ1/2)×N (where N is an integer greater than or equal to 0: N=0, 1, 2, 3, . . . )). Distances x1 and y1, or element dimensions x0 and y0, are set in this manner so that when electromagnetic waves are emitted from the antenna 55, free end reflection occurs at the element side surfaces 503 to 506. Thus, the terahertz element 50 is designed as a resonator (first order resonator) of the terahertz device A1.

The distance from the emitting point P2 to each of the element side surfaces 503 to 506 may differ between the element side surfaces 503 to 506 as long as the distance is calculated from the expressions described above. For example, in FIG. 4, the distance between the emitting point P2 and the element side surface 503 may differ from the distance between the emitting point P2 and the element side surface 504. In the same manner, the distance from the emitting point P2 to the element side surface 505 may differ from the distance between the emitting point P2 and the element side surface 506.

The transmission region 101 in the waveguide 10 has a dimension in the second direction x referred to as long side dimension a and a dimension in the third direction y referred to as short side dimension b. Long side dimension a and short side dimension b are set in accordance with the standard of the waveguide.

In the present embodiment, the terahertz element 50 is arranged so that the emitting point P2 of the terahertz element 50 is located in the center of the transmission region 101 of the waveguide 10 as viewed from the open side (upper side in FIG. 1) of the waveguide 10. Accordingly, the terahertz element 50 is arranged at a position where distance xc from the inner side surface 152, which defines the transmission region 101, to the emitting point P2 in the second direction x is a/2. Further, the terahertz element 50 is arranged at a position where distance yc from the inner side surface 154, which defines the transmission region 101, to the emitting point P2 in the third direction y is b/2.

Preferably, the terahertz element 50, the support substrate 30, and the back short portion 17 each have a dimension in the first direction z (thickness) that is set in accordance with, for example, the frequency (wavelength) of the electromagnetic waves emitted from the terahertz element 50. Preferably, the dimensions in the first direction z (thickness) of the terahertz element 50, the support substrate 30, and the back short portion 17 are set so that their phases are in alignment.

Figure 7:
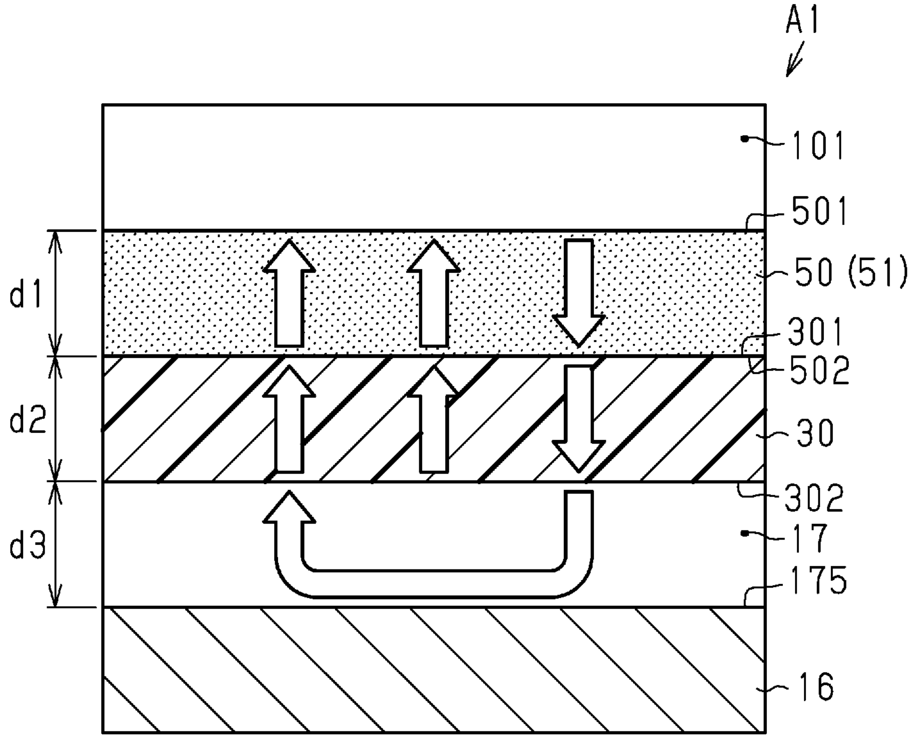
FIG. 7 is a diagram illustrating phase matching in the terahertz device in accordance with the first embodiment.

The arrows in FIG. 7 show the propagation of electromagnetic waves (light path) in the terahertz device A1. The active element 52 shown in FIGS. 5 and 6 is mounted on the element main surface 501 of the terahertz element 50. The active element 52 acts as the generating point P1 that generates terahertz waves, and the antenna 55 acts as the emitting point P2 that emits electromagnetic waves. In FIG. 1, the terahertz element 50 emits electromagnetic waves in a direction orthogonal to the element main surface 501, that is, toward the opening of the main body 14 and toward the short-circuit portion 16.

As shown by the large arrows in FIG. 7, the electromagnetic waves emitted from the element back surface 502 of the terahertz element 50 pass through the terahertz element 50, the support substrate 30, and the back short portion 17 and are reflected by the bottom surface 175 of the back short portion 17. The reflected electromagnetic waves pass through the back short portion 17, the support substrate 30, and the terahertz element 50 and are emitted from the element main surface 501 of the terahertz element 50 into the main body 14 of the waveguide 10.

The terahertz element 50 is formed from InP or the like. The support substrate 30 is formed from fused quartz or the like. The back short portion 17 is open space where the electromagnetic waves propagate through air.

In the terahertz element 50, the terahertz element 50 has a light path length that is an integer multiple of 2π. In the support substrate 30, the light path length in the support substrate 30 is an integer multiple of 2π. Free end reflection of electromagnetic waves occurs at the interface between the support substrate 30 and the back short portion 17. Fixed end reflection of electromagnetic waves occurs at the bottom surface 175 in the back short portion 17. This shifts the phase by π. Thus, in the back short portion 17, phases are aligned by setting the light path length to an odd multiple of π taking into consideration the phase shift amount (it) resulting from reflection.

Preferably, based on the above description, the terahertz element 50 has thickness d1 that is set to (λ1/2)×M (where M is an integer greater than or equal to 1: M=1, 2, 3, . . . ). Here, λ1 represents the effective wavelength of the electromagnetic waves propagated through the terahertz element 50. When n1 represents the refractive index of the terahertz element 50 (element substrate 51), c represents the speed of light, and fc represents the center frequency of electromagnetic waves, λ1 is (1/n1)×(c/fc). Free end reflection of electromagnetic waves occurs at the interface between the terahertz element 50 and the support substrate 30. In this manner, thickness d1 of the terahertz element 50 is set to allow for phase alignment.

Preferably, the support substrate 30 has thickness d2 that is set to (λ2/2)×M (where M is an integer greater than or equal to 1: M=1, 2, 3, . . . ). Here, λ2 represents the effective wavelength of the electromagnetic waves propagated through the support substrate 30. When n2 represents the refractive index of the support substrate 30, c represents the speed of light, and fc represents the center frequency of electromagnetic waves, λ2 is (1/n2)×(c/fc). Free end reflection of electromagnetic waves occurs at the interface between the support substrate 30 and the open space of the back short portion 17. In this manner, thickness d2 of the support substrate 30 is set to allow for phase alignment.

Preferably, the back short portion 17 has thickness d3 that is set to (λ/4)+(λ/2)×M (where M is an integer greater than or equal to 0: M=0, 1, 2, . . . ). Here, λ represents the wavelength of the electromagnetic waves propagated through the terahertz element 50. Thickness d1 of the terahertz element 50, thickness d2 of the support substrate 30, and thickness d3 of the back short portion 17 are set in this manner to allow for phase alignment.

Operation

The operation of the terahertz device A1 will now be described.

In the terahertz device A1 in accordance with the present embodiment, the generating point P1 and the emitting point P2 of the terahertz element 50 are located in the transmission region 101 of the waveguide 10. This reduces loss as compared with when an generating element located outside the transmission region transmits a high-frequency signal to an antenna located in the transmission region to generate electromagnetic waves. Thus, the terahertz device A1 in accordance with the present embodiment obtains a high coupling efficiency between the terahertz element 50 and the waveguide 10.

The terahertz element 50 includes the element main surface 501, the element back surface 502, and the emission pattern, which emits electromagnetic waves in a direction orthogonal to the element main surface 501 and the element back surface 502. The terahertz element 50 is mounted on the substrate main surface 301 of the support substrate 30. The support substrate 30 is attached to the waveguide 10 in correspondence with the emission pattern of the terahertz element 50 so that the emission direction of electromagnetic waves at the terahertz element 50 is parallel to the center axis 102 of the waveguide 10. This couples the terahertz element 50 to the waveguide 10 with high efficiency.

The waveguide 10 includes the short-circuit portion 16 arranged at the side of the element back surface 502 of the terahertz element 50. The short-circuit portion 16 includes the back short portion 17 that is recessed from the main surface 161 toward the back surface 162. The electromagnetic waves emitted from the element back surface 502 of the terahertz element 50 is reflected by the bottom surface 175 of the back short portion 17 and emitted toward the transmission region 101 of the waveguide 10. This increases the output of the electromagnetic waves emitted from the terahertz device A1. Thus, the gain of the terahertz device A1 is increased.

The phase resulting from the light path length of electromagnetic waves is taken into consideration when setting thickness d1 of the terahertz element 50, thickness d2 of the support substrate 30, and thickness d3 of the back short portion 17. This allows for phase alignment of the electromagnetic waves emitted toward the transmission region 101 and couples the terahertz element 50 to the waveguide 10 with high efficiency.

The terahertz element 50 includes the active element 52, which generates electromagnetic waves, and the antenna 55, which is connected to the active element 52. The antenna 55 includes the first conductive portion 531 and the second conductive portion 541, which extend from the active element 52 in opposite directions. The transmission region 101 of the waveguide 10 is formed in accordance with the mode (e.g., TE10 mode) of the waveguide 10. The terahertz element 50 is arranged so that the antenna 55 extends in the short side direction of the transmission region 101. High coupling efficiency is obtained by arranging the terahertz element 50 so that the polarization direction of the antenna 55 is in accordance with the mode of the waveguide 10.

The present embodiment has the advantages described below.

(1-1) The terahertz device A1 includes the terahertz element 50, which generates and emits electromagnetic waves in the terahertz band, and the waveguide 10, which has the transmission region 101 that transmits the electromagnetic waves. The terahertz element 50 includes the element main surface 501 and the element back surface 502 that face opposite directions, the generating point P1 that generates electromagnetic waves on the element main surface 501, and the emitting point P2 that emits electromagnetic waves on the element main surface 501. The terahertz element 50 is arranged so that the generating point P1 and the emitting point P2 are located in the transmission region 101. Thus, the terahertz device A1 in accordance with the present embodiment obtains a high coupling efficiency between the terahertz element 50 and the waveguide 10.

(1-2) The terahertz element 50 includes the element main surface 501, the element back surface 502, and the emission pattern, which emits electromagnetic waves in a direction orthogonal to the element main surface 501 and the element back surface 502. The terahertz element 50 is mounted on the substrate main surface 301 of the support substrate 30. The support substrate 30 is attached to the waveguide 10 in correspondence with the emission pattern of the terahertz element 50 so that the emission direction of electromagnetic waves at the terahertz element 50 is parallel to the center axis 102 of the waveguide 10. This couples the terahertz element 50 to the waveguide 10 with high efficiency.

(1-3) The waveguide 10 includes the short-circuit portion 16 arranged at the side of the element back surface 502 of the terahertz element 50. The short-circuit portion 16 includes the back short portion 17 that is recessed from the main surface 161 toward the back surface 162. The electromagnetic waves emitted from the element back surface 502 of the terahertz element 50 is reflected by the bottom surface 175 of the back short portion 17 and emitted toward the transmission region 101 of the waveguide 10. This increases the output of the electromagnetic waves emitted from the terahertz device A1. Thus, the gain of the terahertz device A1 is increased.

(1-4) The phase resulting from the light path length of electromagnetic waves is taken into consideration when setting thickness d1 of the terahertz element 50, thickness d2 of the support substrate 30, and thickness d3 of the back short portion 17. This allows for phase alignment of the electromagnetic waves emitted toward the transmission region 101 and couples the terahertz element 50 to the waveguide 10 with high efficiency.

(1-5) The terahertz element 50 includes the active element 52, which generates electromagnetic waves, and the antenna 55, which is connected to the active element 52. The antenna 55 includes the first conductive portion 531 and the second conductive portion 541, which extend from the active element 52 in opposite directions. The transmission region 101 of the waveguide 10 is formed in accordance with the mode (e.g., TE10 mode) of the waveguide 10. The terahertz element 50 is arranged so that the antenna 55 extends in the short side direction of the transmission region 101. High coupling efficiency is obtained by arranging the terahertz element 50 so that the polarization direction of the antenna 55 is in accordance with the mode of the waveguide 10.

Second Embodiment

A second embodiment will now be described.

In this embodiment, same reference numerals are given to those components that are the same as the corresponding components of the above embodiment.

Figure 8:
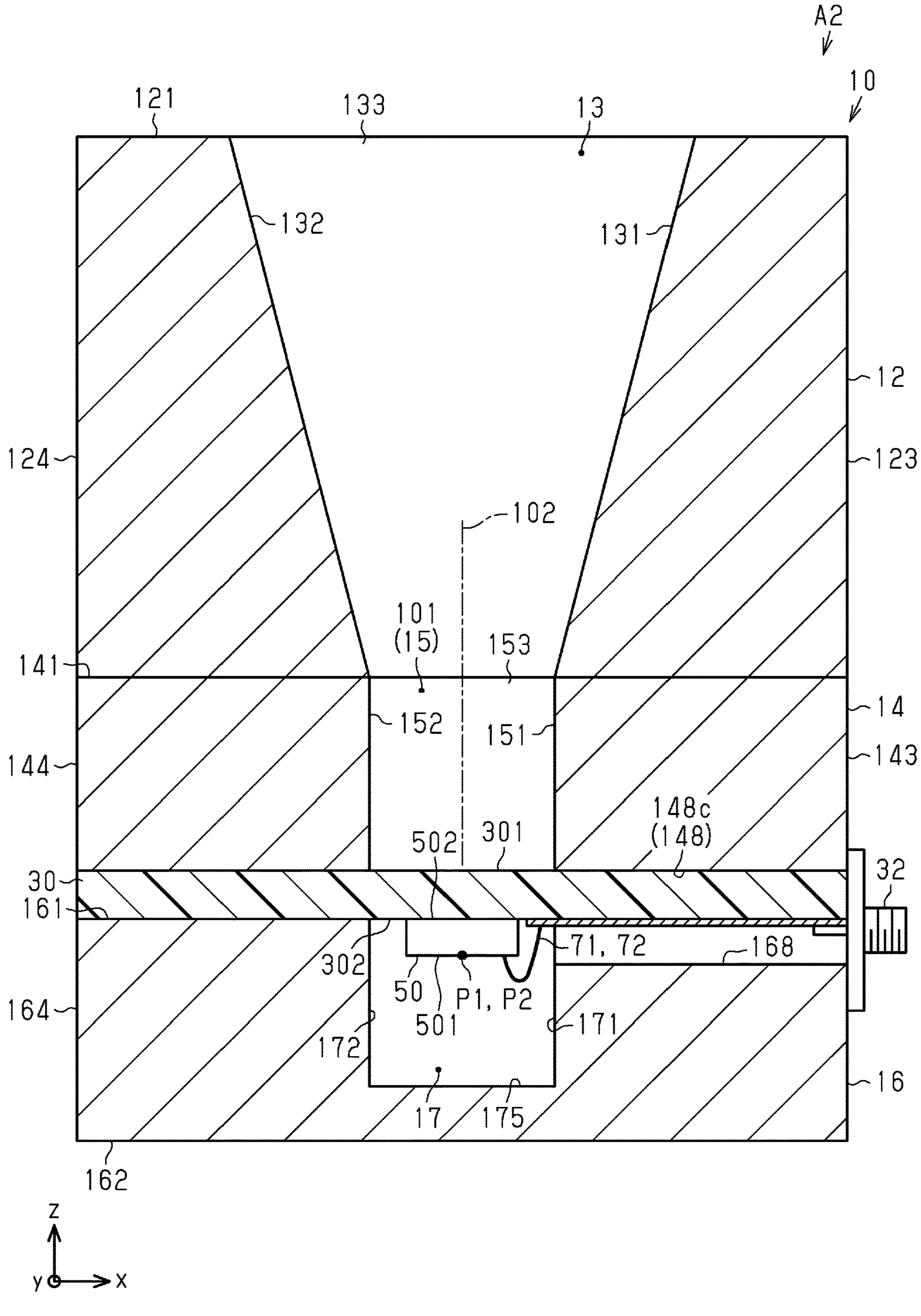
FIG. 8 is a cross-sectional front view showing a terahertz device in accordance with a second embodiment.
Figure 9:
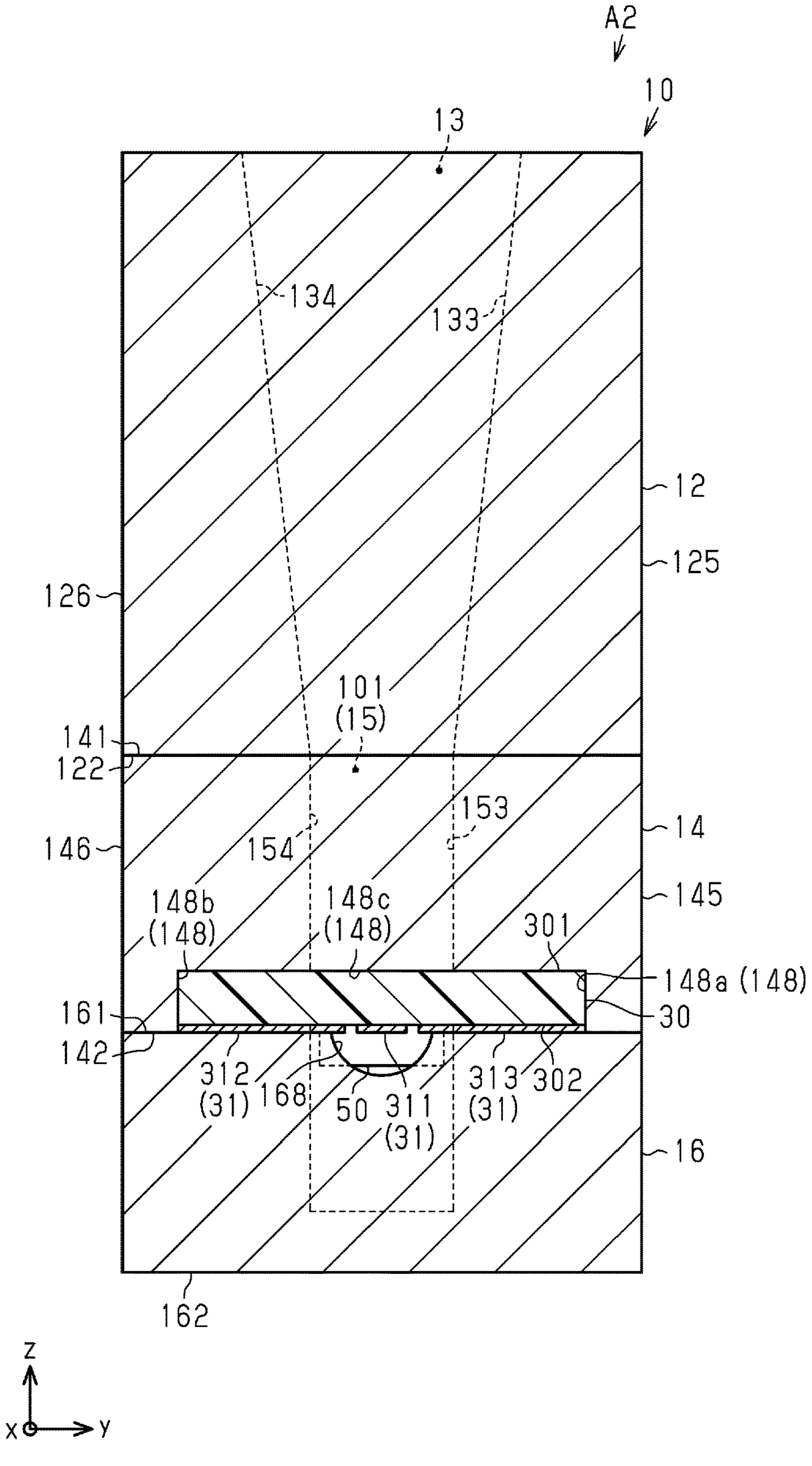
FIG. 9 is a cross-sectional side showing the terahertz device in accordance with the second embodiment.
Figure 10:
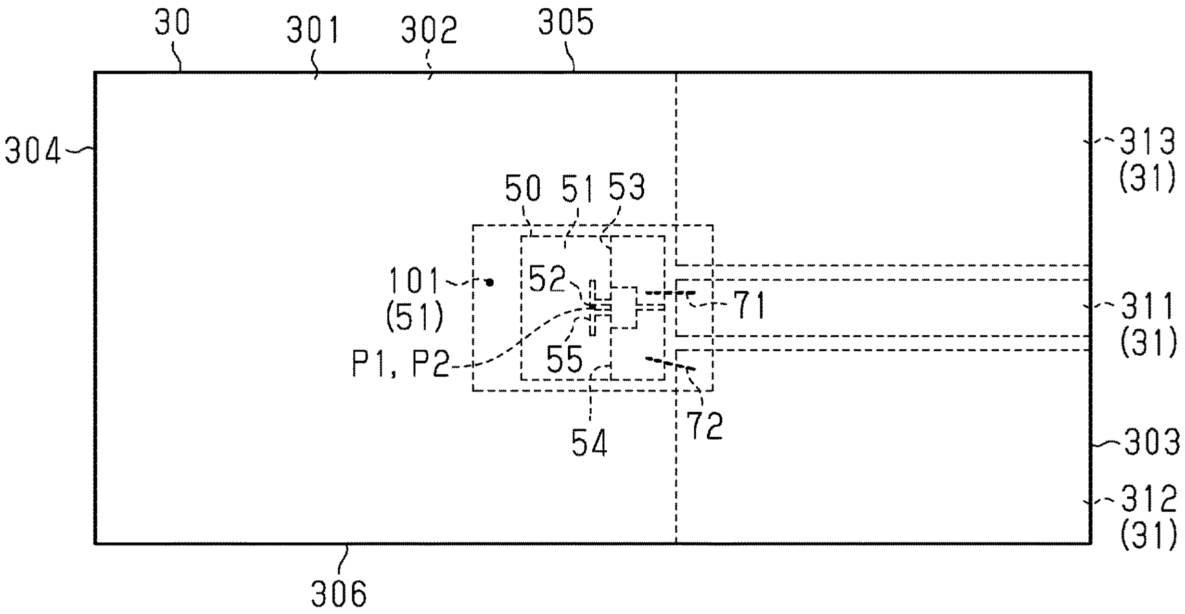
FIG. 10 is a plan view showing a support substrate and a terahertz element of the second embodiment.

As shown in FIGS. 8 to 10, in a terahertz device A2 in accordance with the present embodiment, the terahertz element 50 is mounted on the substrate back surface 302 of the support substrate 30.

The support substrate 30 includes the substrate main surface 301 and the substrate back surface 302 that face opposite directions and the substrate side surface 303 to 306 that intersect the substrate main surface 301 and the substrate back surface 302. The power feed line 31 is formed on the substrate back surface 302.

The waveguide 10 includes the antenna 12, the main body 14, and the short-circuit portion 16. The main body 14 includes a substrate accommodation recess 148 corresponding to the support substrate 30. The substrate accommodation recess 148 is recessed from the back surface 142 of the main body 14 toward the main surface 141. As shown in FIGS. 8 and 9, the substrate accommodation recess 148 extends in the second direction x from the outer side surface 143 of the main body 14 to the outer side surface 144. Although the dimension of the support substrate 30 in the second direction x is equal to the dimension of the main body 14 in the second direction x, the dimension of the support substrate 30 in the second direction x may be changed as long as the support substrate 30 allows the generating point P1 and the emitting point P2 of the terahertz element 50 to be located in the transmission region 101 of the waveguide 10. The substrate accommodation recess 148 of the main body 14 only has to extend from the outer side surface 143 toward the outer side surface 144 over the dimension of the support substrate 30 so as to accommodate the support substrate 30.

As shown in FIG. 9, the substrate accommodation recess 148 is defined by wall surfaces 148*a* and 148*b* and a bottom surface 148*c*. As shown in FIG. 9, the wall surfaces 148*a* and 148*b* face each other in the third direction y. The bottom surface 148*c* faces the short-circuit portion 16 in the first direction z. The substrate accommodation recess 148 may be included in the short-circuit portion 16.

As shown in FIGS. 8 and 9, the short-circuit portion 16 includes a groove 168. The groove 168 is recessed from the main surface 161 of the short-circuit portion 16 toward the back surface 162. The groove 168 extends from the outer side surface 163 of the short-circuit portion 16 to the inner side surface 171 of the back short portion 17. As shown in FIG. 9, the groove 168 has, for example, a semi-circular cross section as viewed in the second direction x. The groove 168 extends along the main conductor 311 of the support substrate 30 so as to surround the main conductor 311. Thus, the short-circuit portion 16 does not contact the main conductor 311. As long as the main conductor 311 does not contact the short-circuit portion 16, the groove 168 may have any cross-sectional shape such as a quadrangular shape or a triangular shape.

Preferably, in the present embodiment, the terahertz element 50, the support substrate 30, and the back short portion 17 each have a dimension in the first direction z (thickness) that is set in accordance with, for example, the frequency (wavelength) of the electromagnetic waves emitted from the terahertz element 50. Further, the dimension (thickness) of the support substrate 30 is preferably set in accordance with the positional relationship of the support substrate 30 and the terahertz element 50. Preferably, the dimensions (thickness) of the terahertz element 50 and the back short portion 17 are set so that their phases are in alignment.

Figure 11:
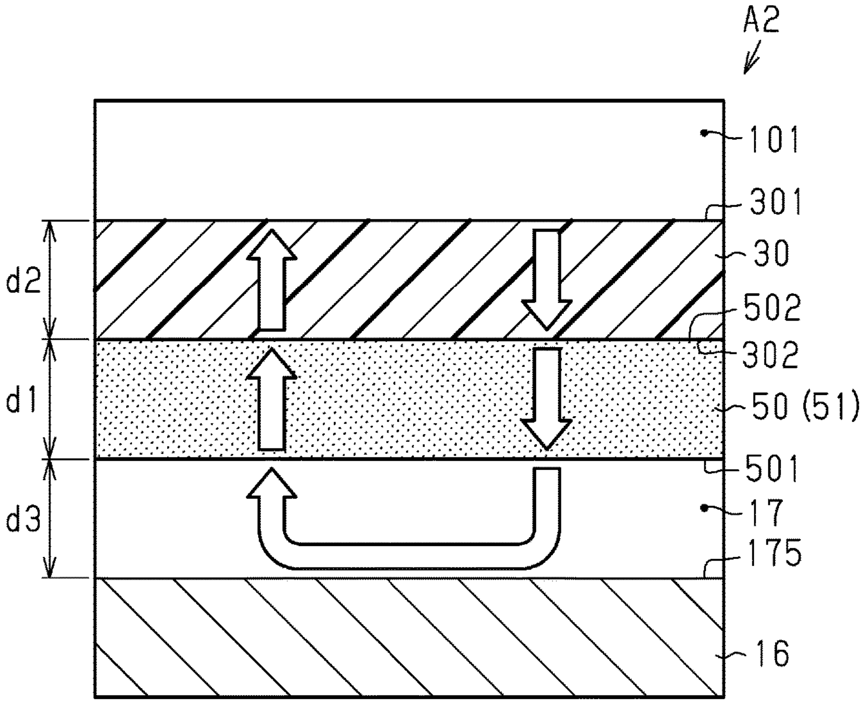
FIG. 11 is a diagram illustrating phase matching in the terahertz device in accordance with the second embodiment.

The arrows in FIG. 11 show the propagation of electromagnetic waves (light path) in the terahertz device A2 in accordance with the present embodiment. The electromagnetic waves emitted from the element back surface 502 of the terahertz element 50 pass through the support substrate 30 and enter the main body 14 of the waveguide 10. Further, the electromagnetic waves emitted from the element main surface 501 of the terahertz element 50 are reflected by the bottom surface 175 of the back short portion 17. The electromagnetic waves then pass through the terahertz element 50 and the support substrate 30 and enter the main body 14.

The material and dimension (thickness) of the support substrate 30 may be set to provide an anti-reflection film (AR coating). Preferably, when the support substrate 30 is an anti-reflection film, thickness d2 of the support substrate 30 is set to $(\lambda 2/4)+(\lambda 2/2)\times M$ (where M is an integer greater than or equal to 0: M=0, 1, 2, . . . ). Here, λ2 represents the effective wavelength of the electromagnetic waves propagated through the support substrate 30. When n2 represents the refractive index of the support substrate 30, c represents the speed of light, and fc represents the center frequency of electromagnetic waves, λ2 is $(1/n2)\times(c/fc)$. Preferably, when n0 represents the refractive index of air and n1 represent the refractive index of the terahertz element 50, the material used for the support substrate 30 preferably has a refractive index represented by n2 or a refractive index close to this value, where $n2=\infty(n0\times n1)$. For example, fused quartz, of which the refractive index is 1.45 may be used as the support substrate 30.

Preferably, thickness d1 of the terahertz element 50 is $(\lambda 1/2)\times M$ (where M is an integer greater than or equal to 1: M=1, 2, 3, . . . ). Here, λ1 represents the effective wavelength of the electromagnetic waves propagated through the terahertz element 50. When n1 represents the refractive index of the terahertz element 50 (element substrate 51), c represents the speed of light, and fc represents the center frequency of electromagnetic waves, λ1 is $(1/n1)\times(c/fc)$. Free end reflection of electromagnetic waves occurs at the interface between the terahertz element 50 and the support substrate 30. In this manner, thickness d1 of the terahertz element 50 is set to allow for phase alignment.

Preferably, the back short portion 17 has thickness d3 that is set to $(\lambda/4)+(\lambda/2)\times M$ (where M is an integer greater than or equal to 0: M=0, 1, 2, . . . ). Here, λ represents the wavelength of the electromagnetic waves propagated through the terahertz element 50. Thickness d1 of the terahertz element 50, thickness d2 of the support substrate 30, and thickness d3 of the back short portion 17 are set in this manner to allow for phase alignment.

As described above, the present embodiment has the following advantage in addition to the advantages of the first embodiment.

(2-1) The terahertz element 50 is mounted on the substrate back surface 302 of the support substrate 30. The support substrate 30 is fixed between the main body 14 and the short-circuit portion 16 with the substrate main surface 301 directed toward the opening of the main body 14. Accordingly, the terahertz element 50 is accommodated in the back short portion 17, which is formed in the short-circuit portion 16. Further, the back short portion 17 is closed by the support substrate 30. Thus, even when foreign matter enters the transmission region 101 of the main body 14 through the antenna 12 of the waveguide 10, the foreign matter will have limited effect on the terahertz element 50 and the wires 71 and 72.

Third Embodiment

A third embodiment will now be described.

In this embodiment, same reference numerals are given to those components that are the same as the corresponding components of the above embodiments.

Figure 12:
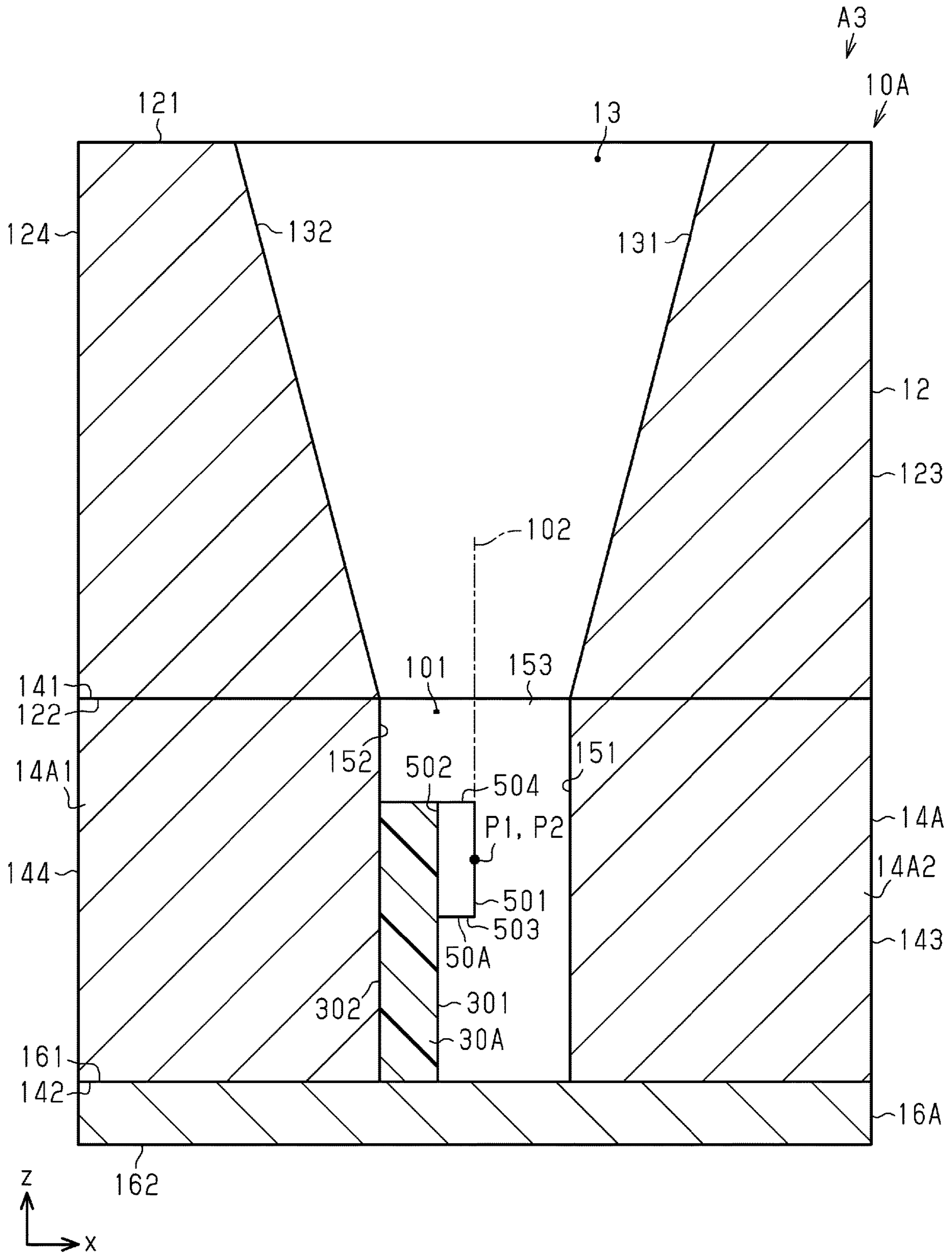
FIG. 12 is a cross-sectional front view showing a terahertz device in accordance with a third embodiment.
Figure 13:
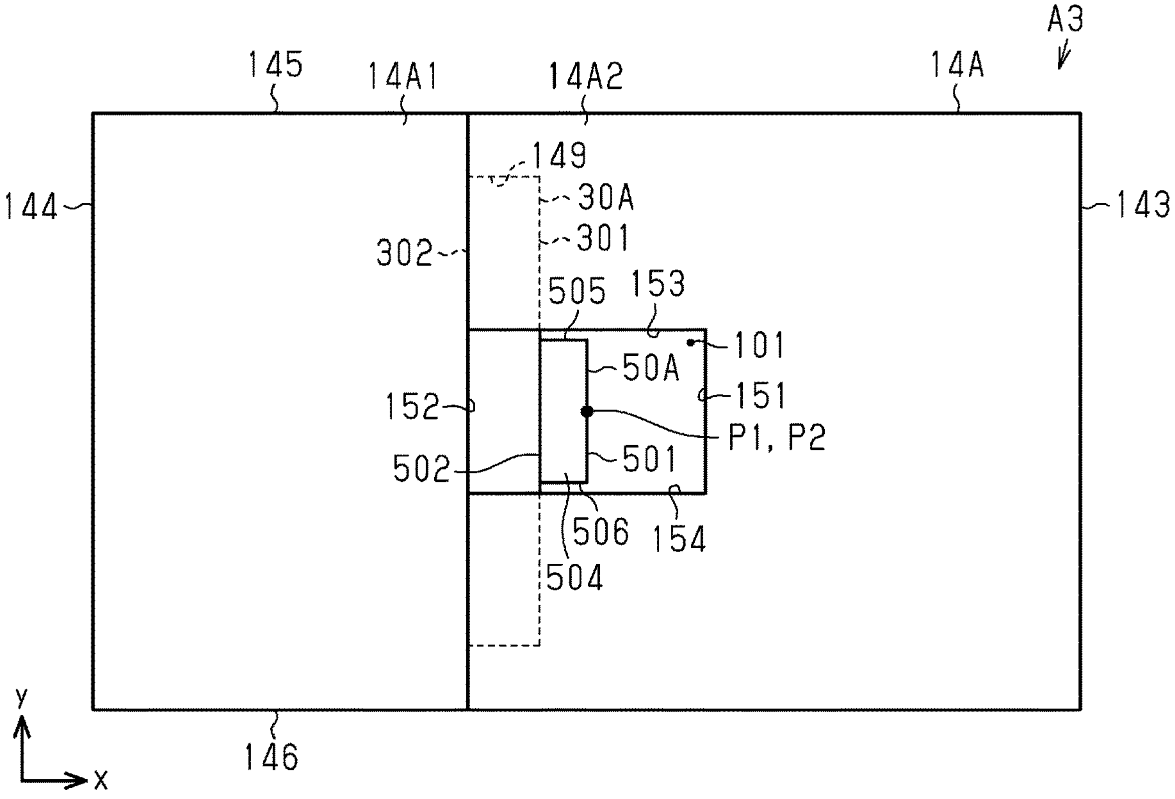
FIG. 13 is a partially enlarged view of the terahertz device in accordance with the third embodiment.

FIGS. 12 to 14 show a terahertz device A3 in accordance with the third embodiment. The terahertz device A3 includes a waveguide 10A, a support substrate 30A, and a terahertz element 50A.

The waveguide 10A includes the antenna 12, a main body 14A, and a short-circuit portion 16A.

As shown in FIGS. 12 and 13, the support substrate 30A includes the substrate main surface 301, the substrate back surface 302, and the substrate side surfaces 303, 304, 305, and 306.

The substrate main surface 301 and the substrate back surface 302 face opposite directions with respect to the second direction x. The substrate side surfaces 303 and 304 face opposite directions with respect to the first direction z, and the substrate side surfaces 305 and 306 face opposite directions in the third direction y. Thus, the support substrate 30A is attached to the waveguide 10A so that the substrate main surface 301 and the substrate back surface 302 are parallel to the center axis 102 of the waveguide 10A.

In an example, the main body 14A of the waveguide 10 includes the inner side surfaces 151, 152, 153, and 154 that define the transmission region 101. The main body 14A of the waveguide 10 further includes a first wall member 14A1 that forms the inner side surface 152 and a second wall member 14A2 that forms the inner side surface 151, 153, and 154. The first wall member 14A1 is flat. The substrate back surface 302 of the support substrate 30A is attached to the first wall member 14A1 in contact with the first wall member 14A1 or by an intermediate layer of an adhesive or the like. The second wall member 14A2 includes a substrate accommodation recess 149 corresponding to the support substrate 30A. The first wall member 14A1 and the second wall member 14A2 support the support substrate 30A so as to sandwich the support substrate 30A.

The terahertz element 50A is mounted on the support substrate 30A and arranged in the main body 14A.

In the present embodiment, the terahertz element 50A includes the element main surface 501, the element back surface 502, and the element side surfaces 503 to 506. The terahertz element 50A includes the emitting point P2 and the generating point P1 in the center of the element main surface 501. The terahertz element 50A of the present embodiment includes an emission pattern that emits electromagnetic waves in a direction parallel to the element main surface 501. The terahertz element 50A of the present embodiment is configured to emit electromagnetic waves in a direction orthogonal to the element side surfaces 503 and 504.

The terahertz element 50A is mounted on the substrate main surface 301 of the support substrate 30A. As shown in FIG. 12, the terahertz element 50A is mounted on the support substrate 30A toward the end located at the side of the substrate side surface 304. In the present embodiment, the element side surface 504 of the terahertz element 50A is flush with the substrate side surface 304 of the support substrate 30A. The support substrate 30A is attached to the waveguide 10A so that the emission direction of the terahertz element 50A mounted on the substrate main surface 301 is parallel to the center axis 102 of the waveguide 10A.

As shown in FIG. 14, the terahertz element 50A includes the element substrate 51, the active element 52, the first conductor layer 53, and the second conductor layer 54. The first conductor layer 53 and the second conductor layer 54 are each formed on the element main surface 501. The first conductor layer 53 and the second conductor layer 54 are insulated from each other.

The first conductor layer 53 includes a first conductive portion 534 and the first pad electrode 533. The second conductor layer 54 includes a second conductive portion 544 and the second pad electrode 543.

The first conductive portion 534 and the second conductive portion 544 extend in a direction orthogonal to the element side surfaces 503 and 504 of the terahertz element 50A (first direction z) and are separated from each other in a direction orthogonal to the element side surfaces 505 and 506 (third direction y). Further, the first conductive portion 534 and the second conductive portion 544 are formed so that the distance therebetween in a direction parallel to the element side surface 504 (third direction y) increases toward the element side surface 504. Thus, a tapered slot between the first conductive portion 534 and the second conductive portion 544 widens toward the element side surface 504. The first conductive portion 534 and the second conductive portion 544 function as the antenna 55A. The antenna 55A is, for example, a tapered slot antenna. The antenna 55A emits the electromagnetic waves generated by the terahertz element 50A in a direction parallel to the element main surface 501 of the terahertz element 50A, that is, in a sideward direction with respect to the terahertz element 50A. The antenna 55A is not limited to a tapered slot antenna and may be another type of antenna such as a Yagi-Uda antenna, a dipole antenna, a bowtie antenna, a patch antenna, or a ring antenna.

The present embodiment has the advantages described below.

(3-1) Advantage (1-1) of the first embodiment is obtained.

(3-2) The terahertz element 50A includes the emission pattern that emits electromagnetic waves in a direction orthogonal to the element side surfaces 503 and 504. The terahertz element 50A is mounted on the substrate main surface 301 of the support substrate 30A. The support substrate 30A is attached to the waveguide 10A in correspondence with the emission pattern of the terahertz element 50A so that the emission direction of electromagnetic waves at the terahertz element 50A is parallel to the center axis 102 of the waveguide 10A. This couples the terahertz element 50A to the waveguide 10A with high efficiency.

Modified Examples

The above embodiments may be modified as described below. The modified examples described below may be combined as long as there is no technical contradiction.

In the first embodiment, the bottom surface 175 in the back short portion 17 of the short-circuit portion 16 in the terahertz device A1 functions as a reflector located at the side of the element back surface 502 of the terahertz element 50. The structure and location of the reflector may be changed.

Figure 15:
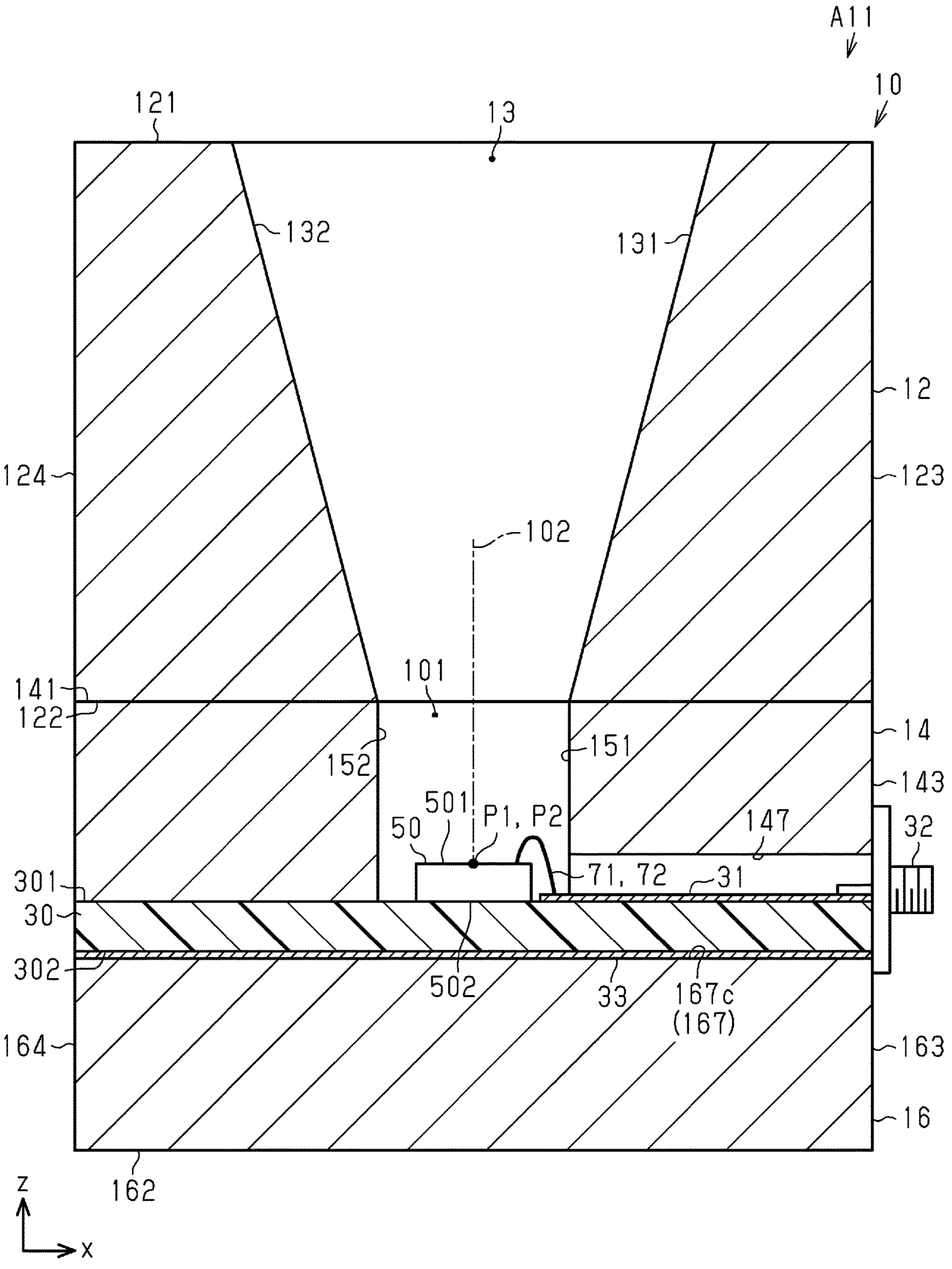
FIG. 15 is a cross-sectional front view showing a modified example of the terahertz device.
Figure 16:
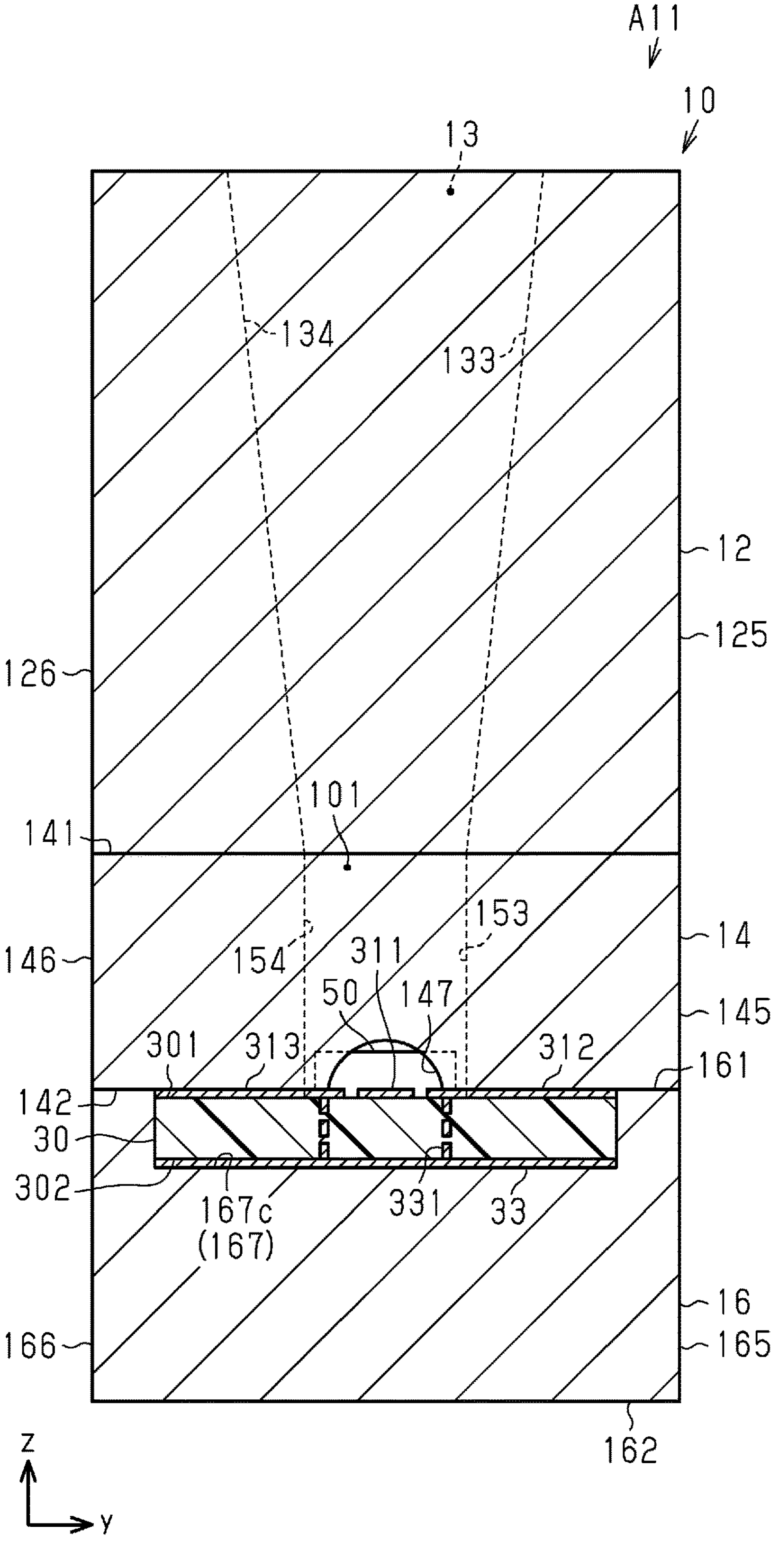
FIG. 16 is a cross-sectional side view showing the terahertz device of FIG. 15.
Figure 17:
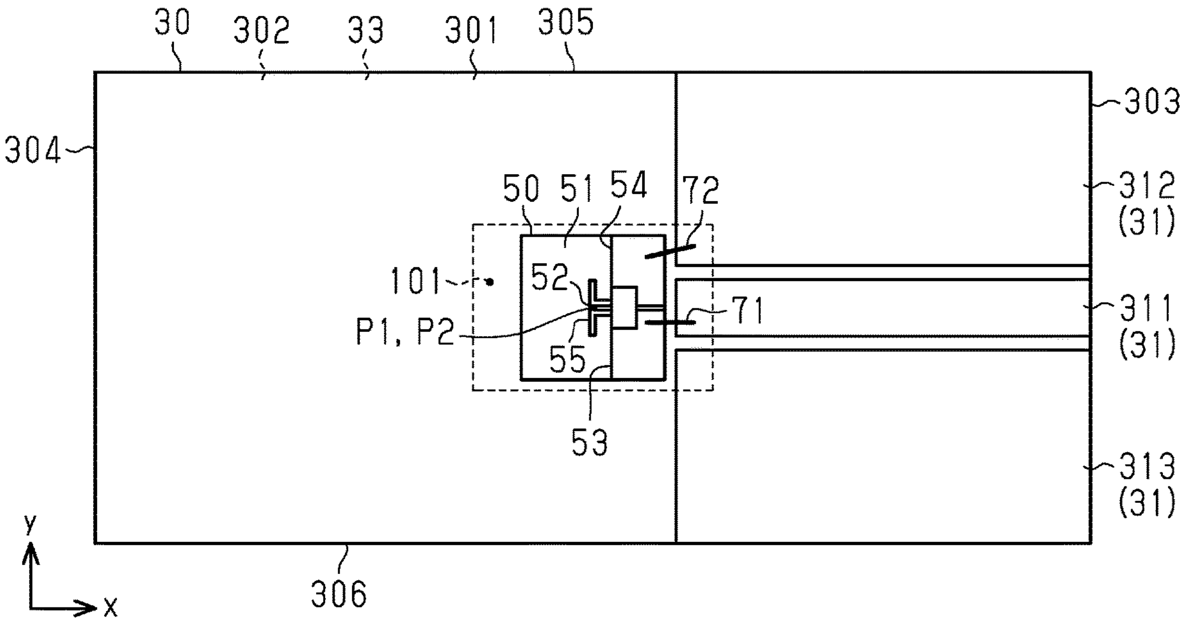
FIG. 17 is a plan view showing a support substrate and a terahertz element of the terahertz device of FIG. 15.

FIGS. 15 to 17 show a terahertz device A11 including a reflective film 33 serving as a reflector formed on the substrate back surface 302 of the support substrate 30. The terahertz element 50 is mounted on the substrate main surface 301. The reflective film 33 is formed from, for example, Cu. As shown in FIG. 16, the reflective film 33 is electrically connected to the ground conductors 312 and 313 of the substrate main surface 301 by, for example, through-electrodes 331 that extend through the support substrate 30. The through-electrodes 331 may be omitted.

The short-circuit portion 16 may be used as a reflector that reflects electromagnetic waves. More specifically, in the short-circuit portion 16 of the first embodiment, the back short portion 17 may be omitted, and electromagnetic waves may be reflected by the bottom surface 167*c* of the substrate accommodation recess 167 of the short-circuit portion 16. When reflecting electromagnetic waves in such a manner, fixed end reflection occurs at the interface between the substrate back surface 302 of the support substrate 30 and the reflective film 33 or at the bottom surface 167*c* of the short-circuit portion 16. This shifts the phase by $\pi$. Thus, preferably, thickness d2 of the support substrate 30 is set to $(\lambda 2/4)+(\lambda 2/2)\times M$ (where M is an integer greater than or equal to 0, and M=0, 1, 2, . . . ) taking into consideration the frequency (wavelength) of electromagnetic waves and the phase shifted by the reflector.

Figure 18:
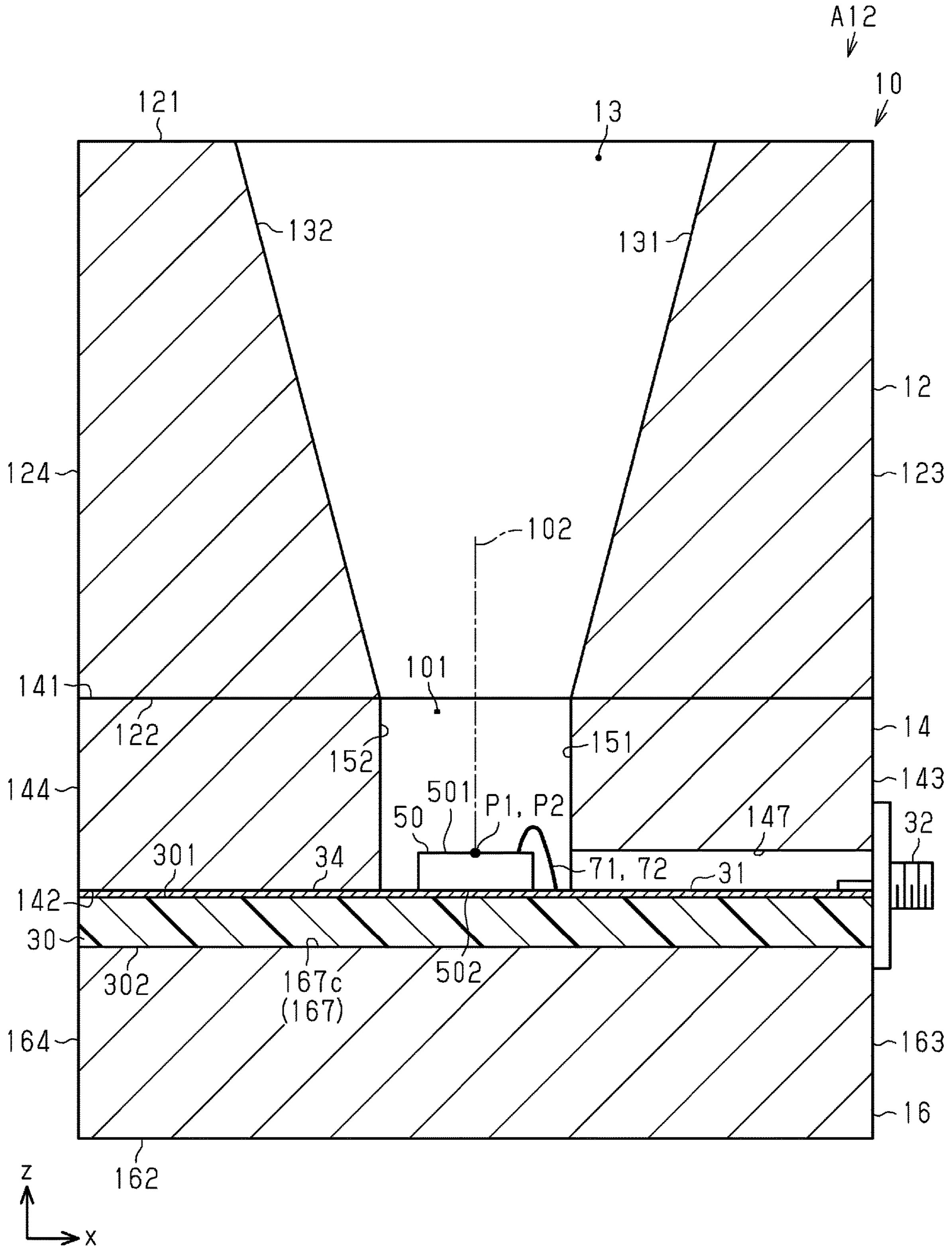
FIG. 18 is a cross-sectional front view showing a modified example of the terahertz device.
Figure 19:
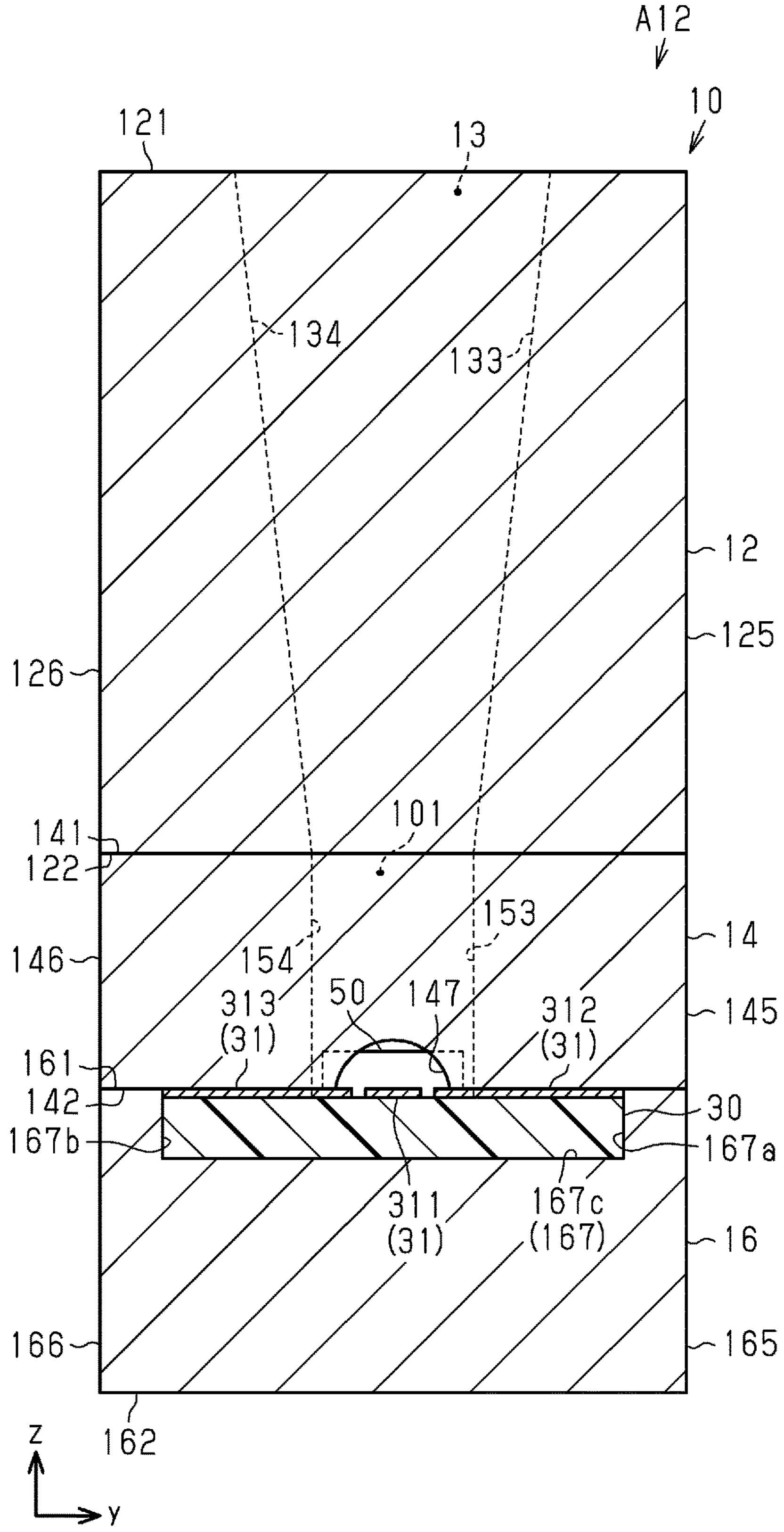
FIG. 19 is a cross-sectional side view showing the terahertz device of FIG. 18.
Figure 20:
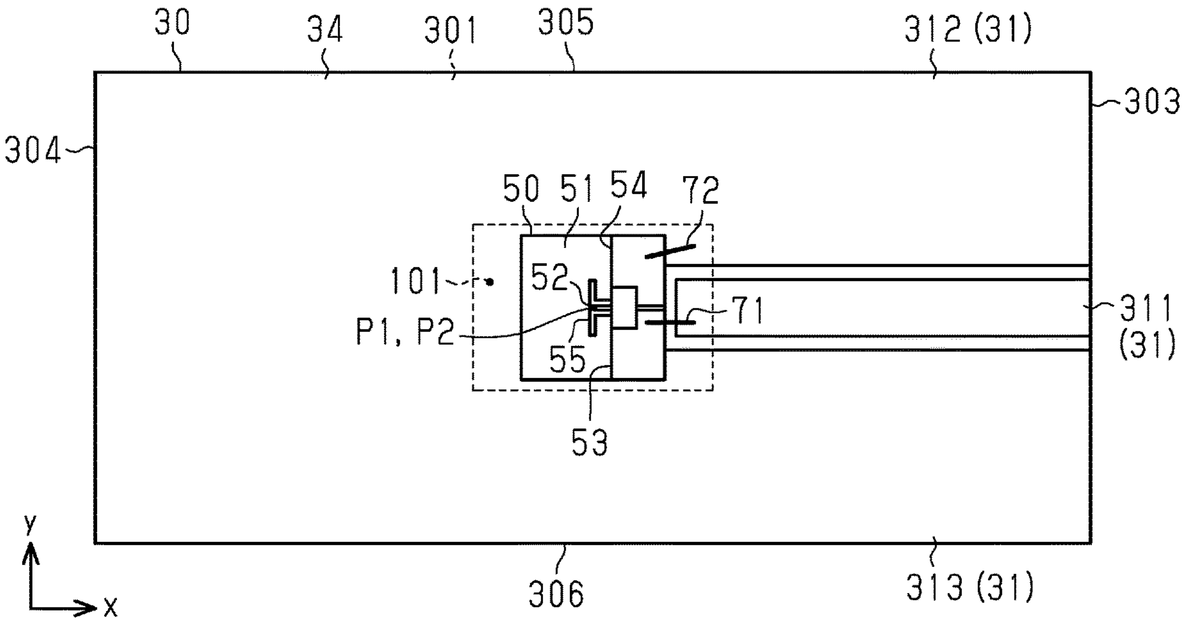
FIG. 20 is a plan view showing a support substrate and a terahertz element of terahertz device of FIG. 18.

FIGS. 18 to 20 show a terahertz device A12 including a reflective film 34 formed as a reflector on the substrate main surface 301 of the support substrate 30. The reflective film 34 is formed from, for example, Cu. As shown in FIG. 20, the reflective film 34 is formed continuously and connected to the ground conductors 312 and 313. In this case, fixed end reflection of electromagnetic waves occur at the reflective film 34. This shifts the phase by $\pi$. Thus, preferably, the dimension (thickness d1) of the terahertz element 50 in the first direction z is set to $(\lambda 1/4)+(\lambda 1/2)\times M$ (where M is an integer greater than or equal to 0, and M=0, 1, 2, . . . ). Here, $\lambda$1 represent the wavelength of electromagnetic waves in the terahertz element 50.

The reflective film 34 may be formed as a reflector on, for example, the terahertz element 50. For example, in, a reflective film is formed on the element back surface 502 of the element substrate 51 at the side opposite the element main surface 501 where the active element 52 is arranged. The reflective film is formed by, for example, Au/Ti, Au/Pd/Ti, or the like. Further, a reflective film may be formed on the substrate main surface 301 of the support substrate 30 and on the element back surface 502 of the terahertz element 50.

Figure 21:
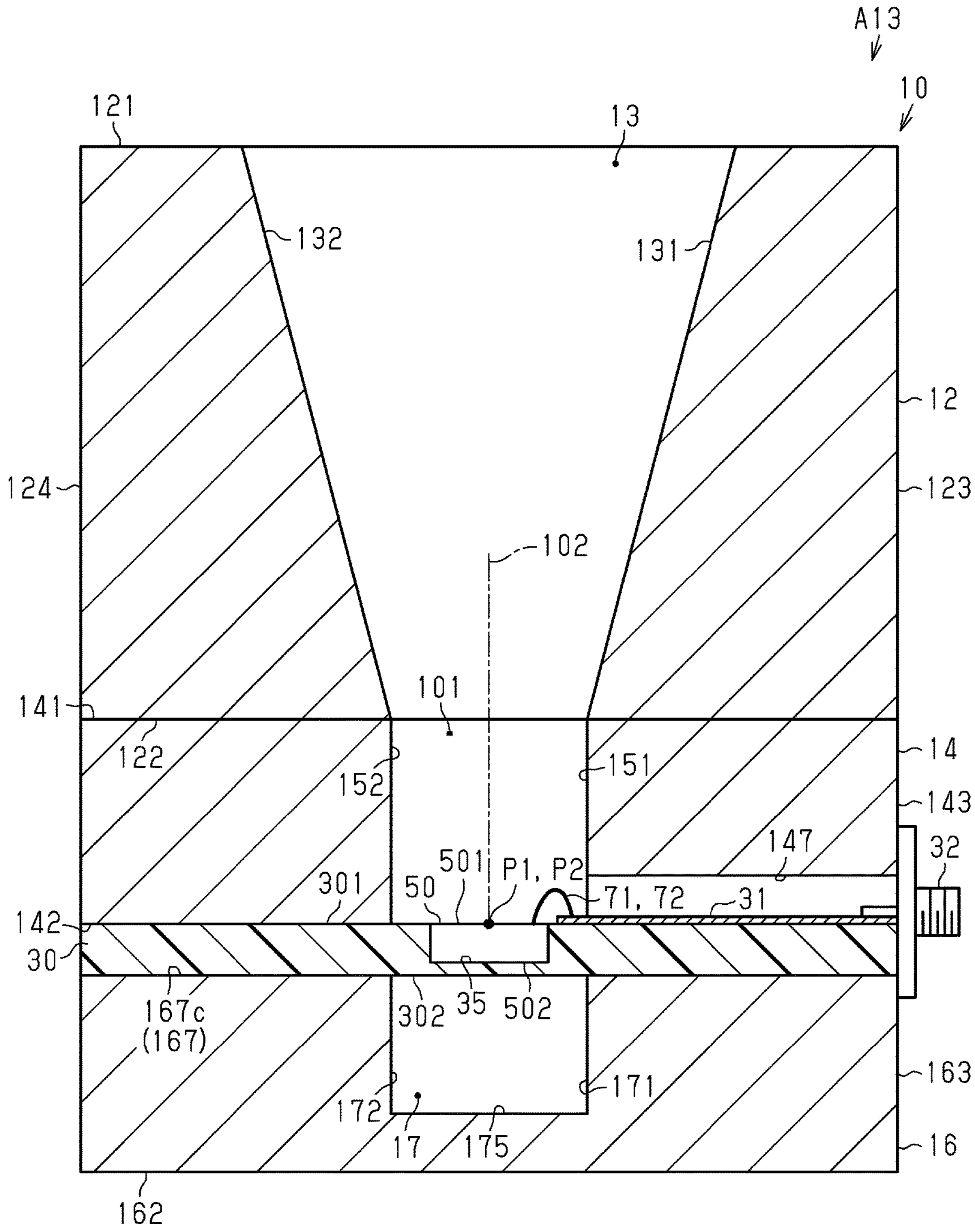
FIG. 21 is a cross-sectional front view showing a modified example of the terahertz device.

FIG. 21 shows a terahertz device A13 that embeds the terahertz element 50 in an element accommodation recess 35 of the support substrate 30. In the modified example shown in FIG. 21, the substrate main surface 301 of the support substrate 30 is flush with the element main surface 501 of the terahertz element 50. This shortens the wires 71 and 72 connecting the terahertz element 50 and the support substrate 30 and allows for high-speed signal transmission.

Figure 22:
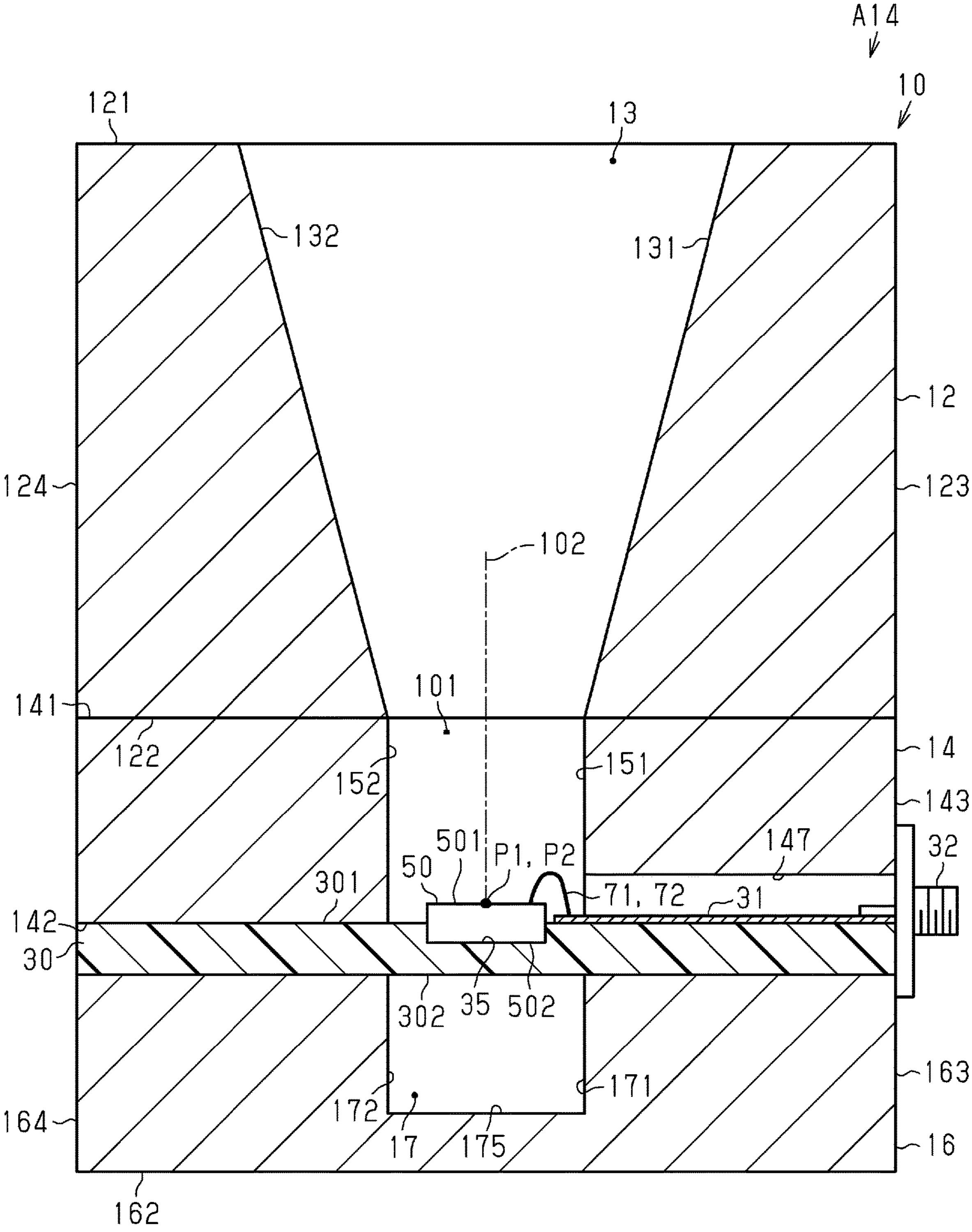
FIG. 22 is a cross-sectional front view showing a modified example of the terahertz device.

FIG. 22 shows a terahertz device A14 that embeds part of the terahertz element 50 in the element accommodation recess 35 of the support substrate 30. This shortens the length of the wires 71 and 72 and allows for high-speed signal transmission. The thickness between the bottom surface of the element accommodation recess 35 in the support substrate 30 and the substrate back surface 302 may be set in accordance with the frequency (wavelength) of electromagnetic waves. That is, the depth of the element accommodation recess 35 can be set to allow for alignment of electromagnetic waves.

Figure 23:
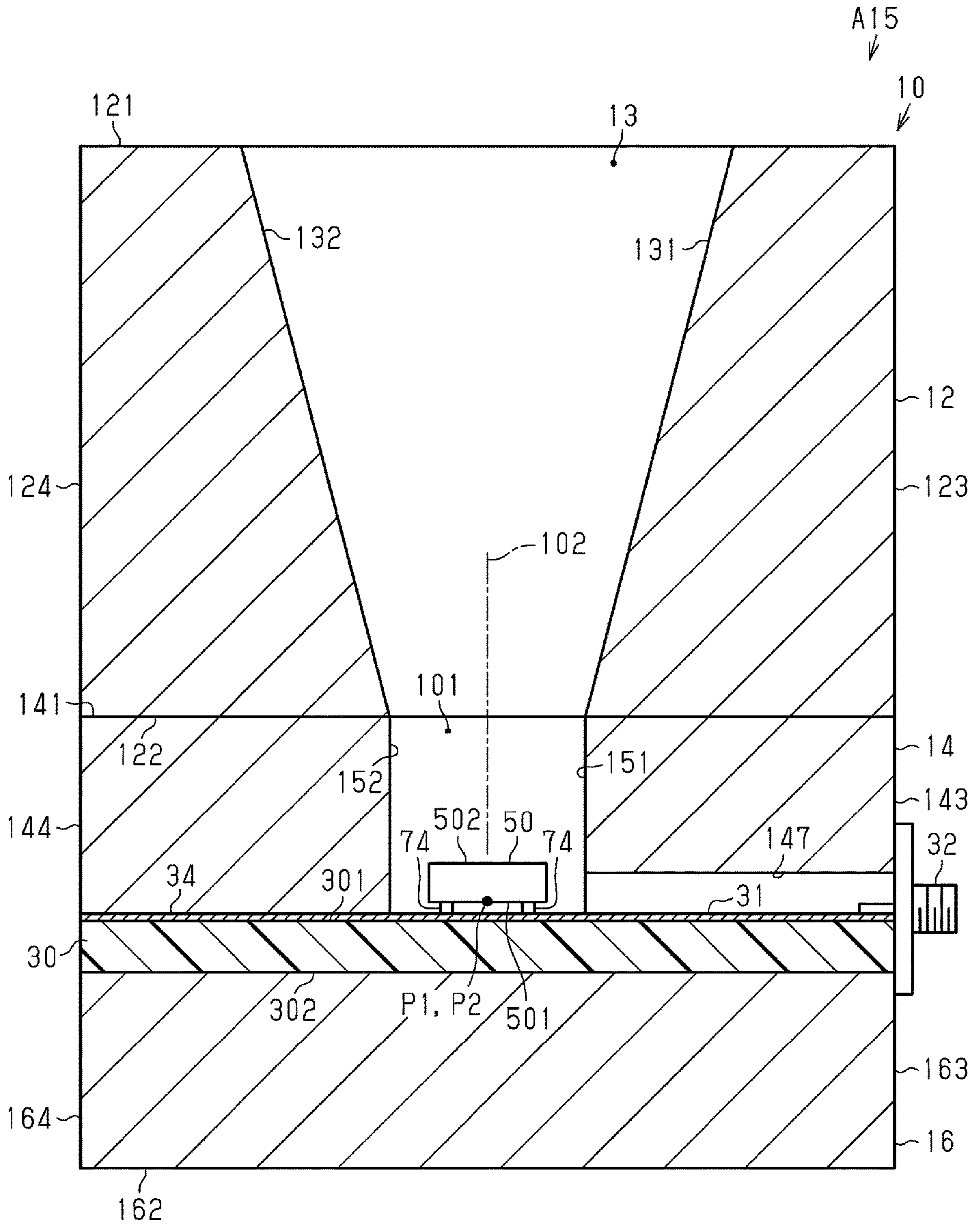
FIG. 23 is a cross-sectional front view showing a modified example of the terahertz device.

FIG. 23 shows a terahertz device A15, on which the terahertz element 50 is flip-chip mounted on the support substrate 30 using bumps 74. This allows for signal transmission at higher speeds and reduces the effect that wires connecting the terahertz element 50 and the support substrate 30 would have on a propagation mode in the waveguide 10.

Figure 24:
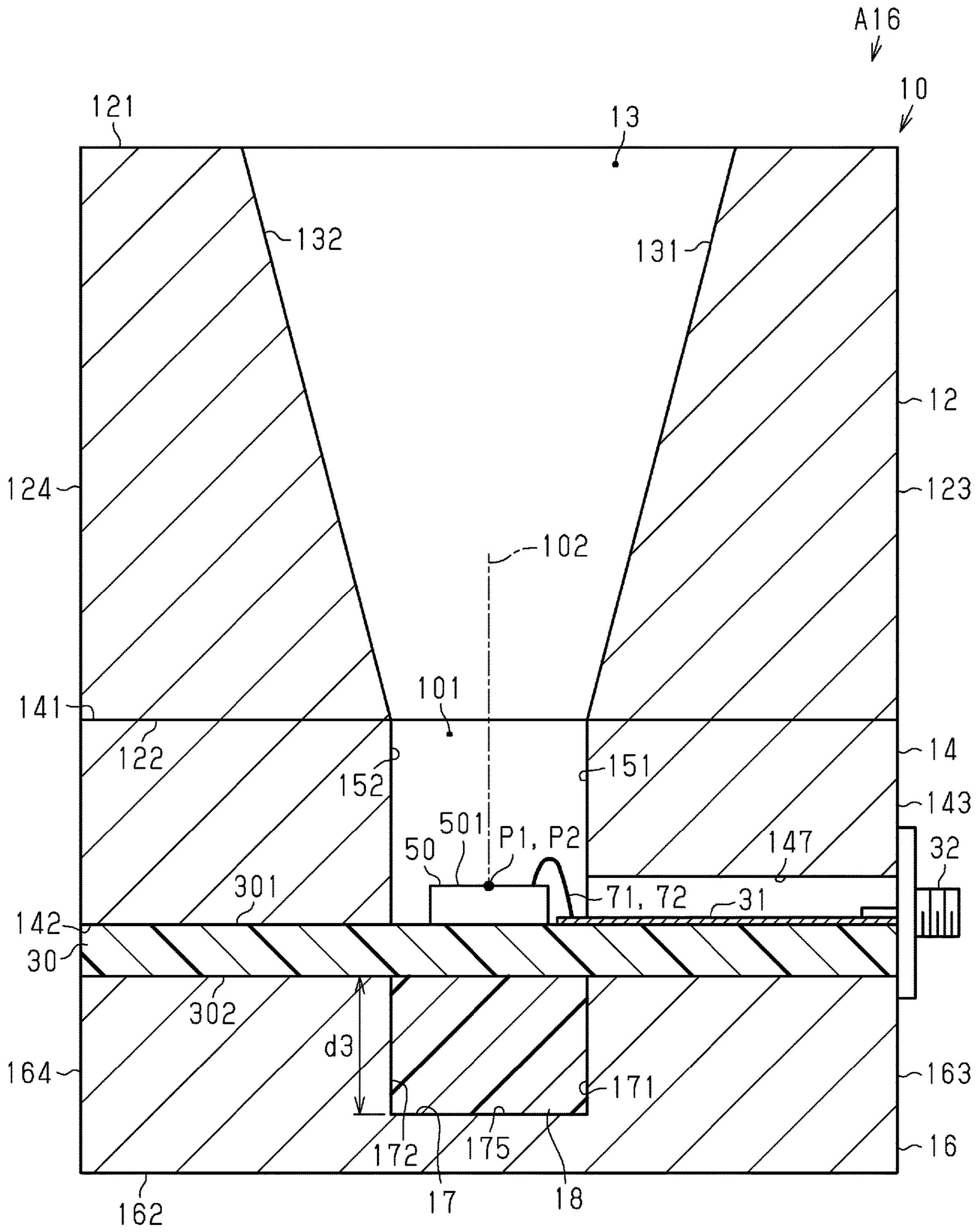
FIG. 24 is a cross-sectional front view showing a modified example of the terahertz device.

FIG. 24 shows a terahertz device A16 in which the back short portion 17 of the short-circuit portion 16 is filled with a dielectric body 18. The type (material, construction ratio) of the dielectric body 18 in the back short portion 17 may be varied to adjust the impedance with the permittivity of the dielectric body 18 without changing the thickness d3 of the back short portion 17.

Figure 25:
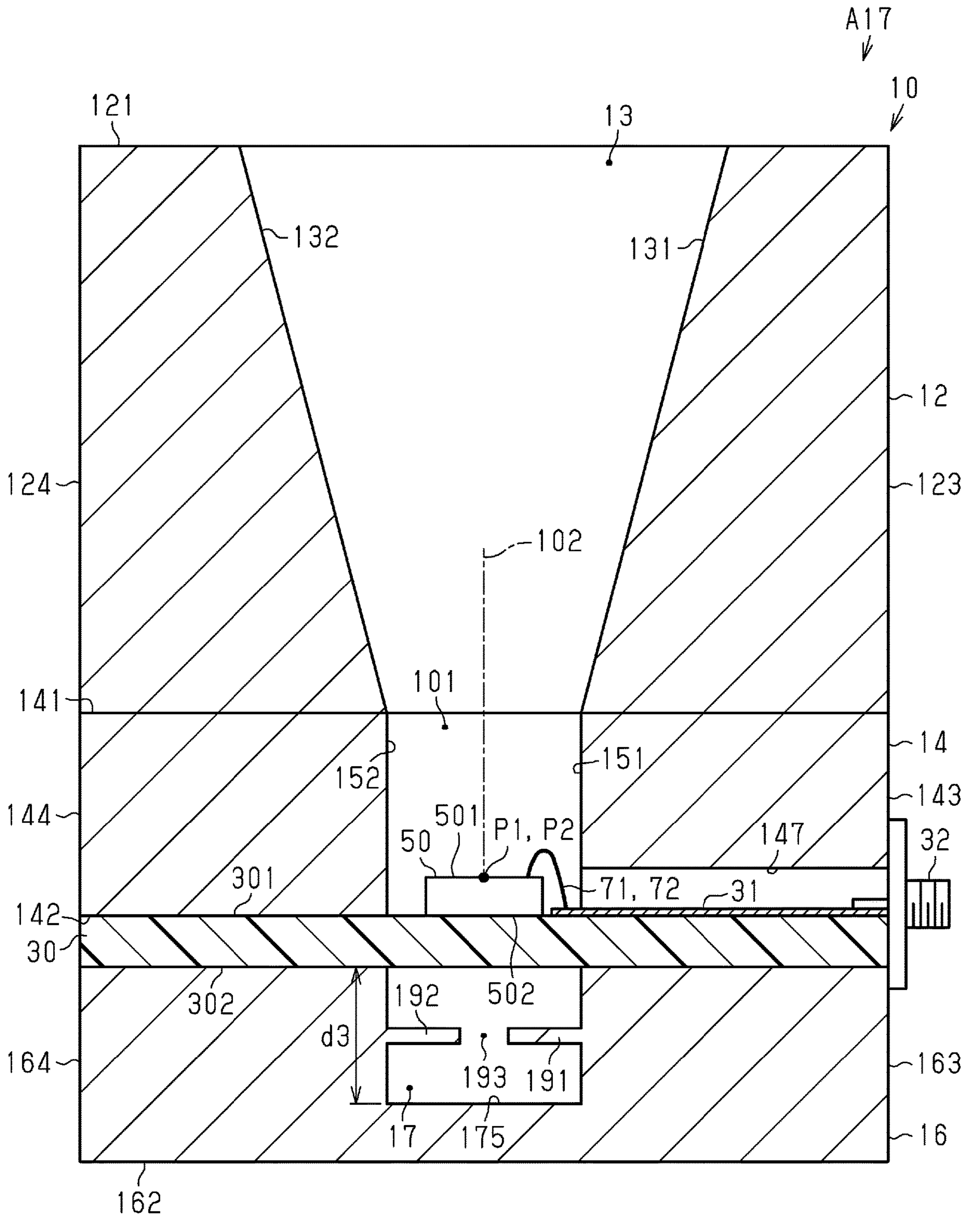
FIG. 25 is a cross-sectional front view showing a modified example of the terahertz device.

FIG. 25 shows a terahertz device A17 with the back short portion 17 of the short-circuit portion 16 changed in shape. The short-circuit portion 16 includes shields 191 and 192 at an intermediate part of the back short portion 17 in the depth direction (first direction z). The shields 191 and 192 are, for example, separated from each other in the second direction x to form a slit 193. The impedance can be set in accordance with the width and position of the slit 193.

Figure 26:
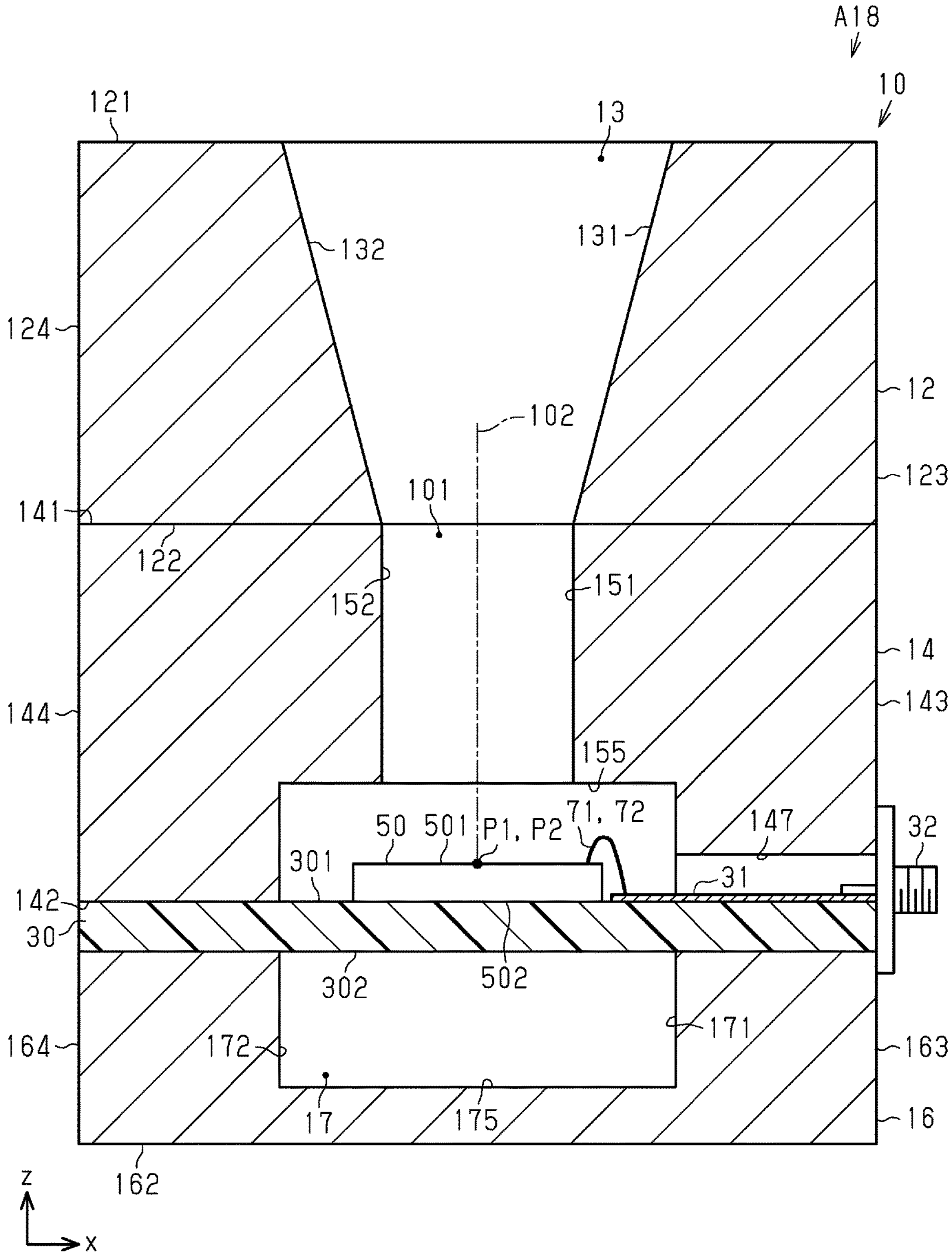
FIG. 26 is a cross-sectional front view showing a modified example of the terahertz device.

FIG. 26 shows a terahertz device Alb including a terahertz element 50 with an element main surface 501 that is larger than the transmission region 101 of the waveguide 10. In the terahertz device A18, the main body 14 of the waveguide 10 includes an element accommodation portion 155 that is larger than the terahertz element 50. The element accommodation portion 155 allows terahertz elements 50 of various sizes to be incorporated in the waveguide 10. This allows the terahertz device A18 to include any of various types of terahertz elements 50.

Figure 27:
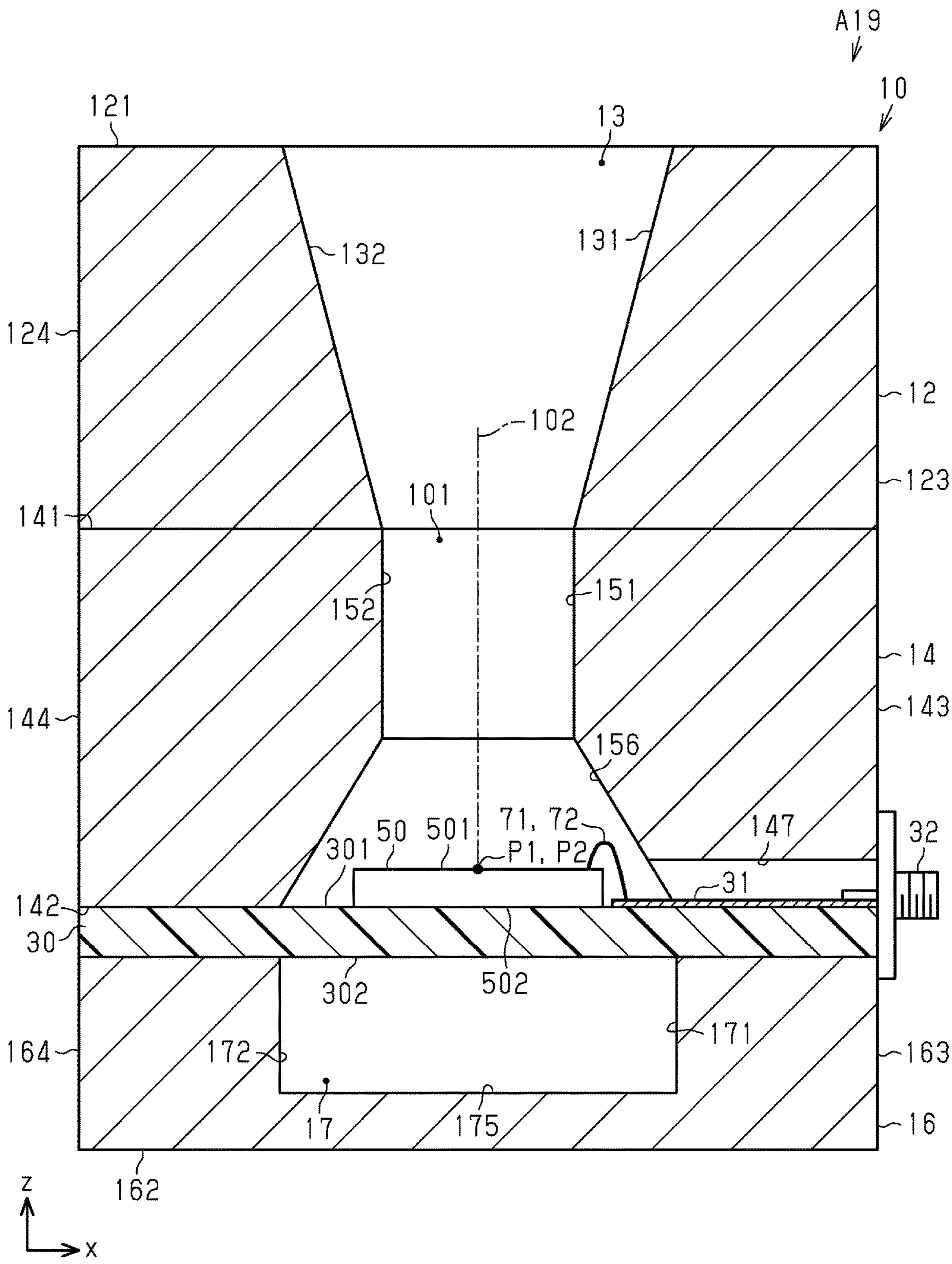
FIG. 27 is a cross-sectional front view showing a modified example of the terahertz device.

FIG. 27 shows a terahertz device A19 with an element accommodation portion 156 having a shape that is tapered like a truncated tetragonal pyramid so that the width gradually narrows toward the transmission region 101 to avoid non-matching.

Figure 28:
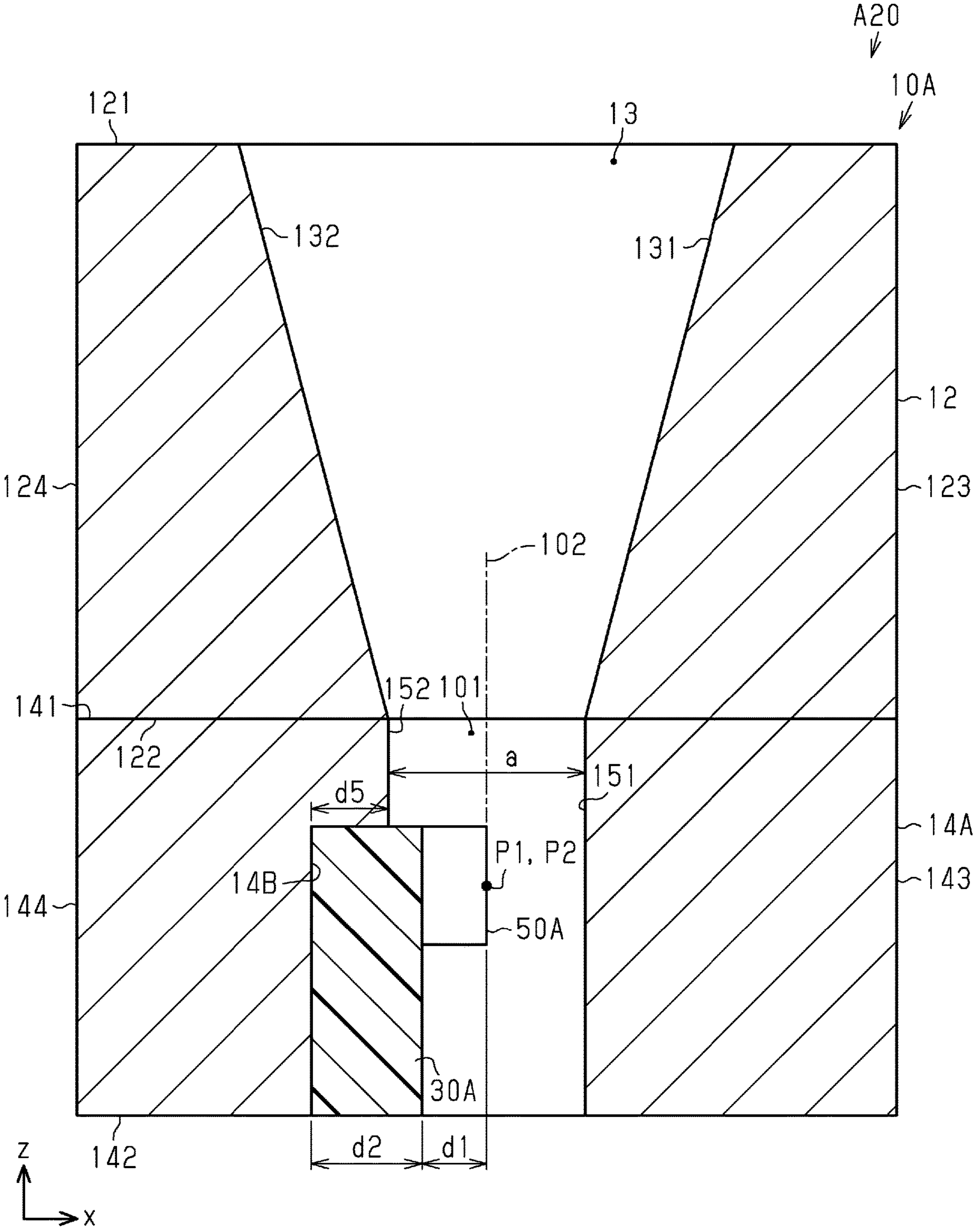
FIG. 28 is a cross-sectional front view showing a modified example of the terahertz device.

FIG. 28 shows a terahertz device A20 that differs from the terahertz device A3 in accordance with the third embodiment in the thickness d2 of the support substrate 30A. The waveguide 10A includes a recess 14B that accommodates part of the support substrate 30A in the first wall member 14A1. In FIG. 28, the short-circuit portion 16A shown in FIG. 12 is omitted. The depth d5 of the recess 14B in the second direction x is set to d5=d1+d2−(a/2) so that the emitting point P2 on the element main surface 501 of the terahertz element 50 coincides with the center axis 102 of the transmission region 101, where d2 represents the thickness of the support substrate 30A, d1 represents the thickness of the terahertz element 50, and a represents the dimension of the transmission region 101.

Figure 29:
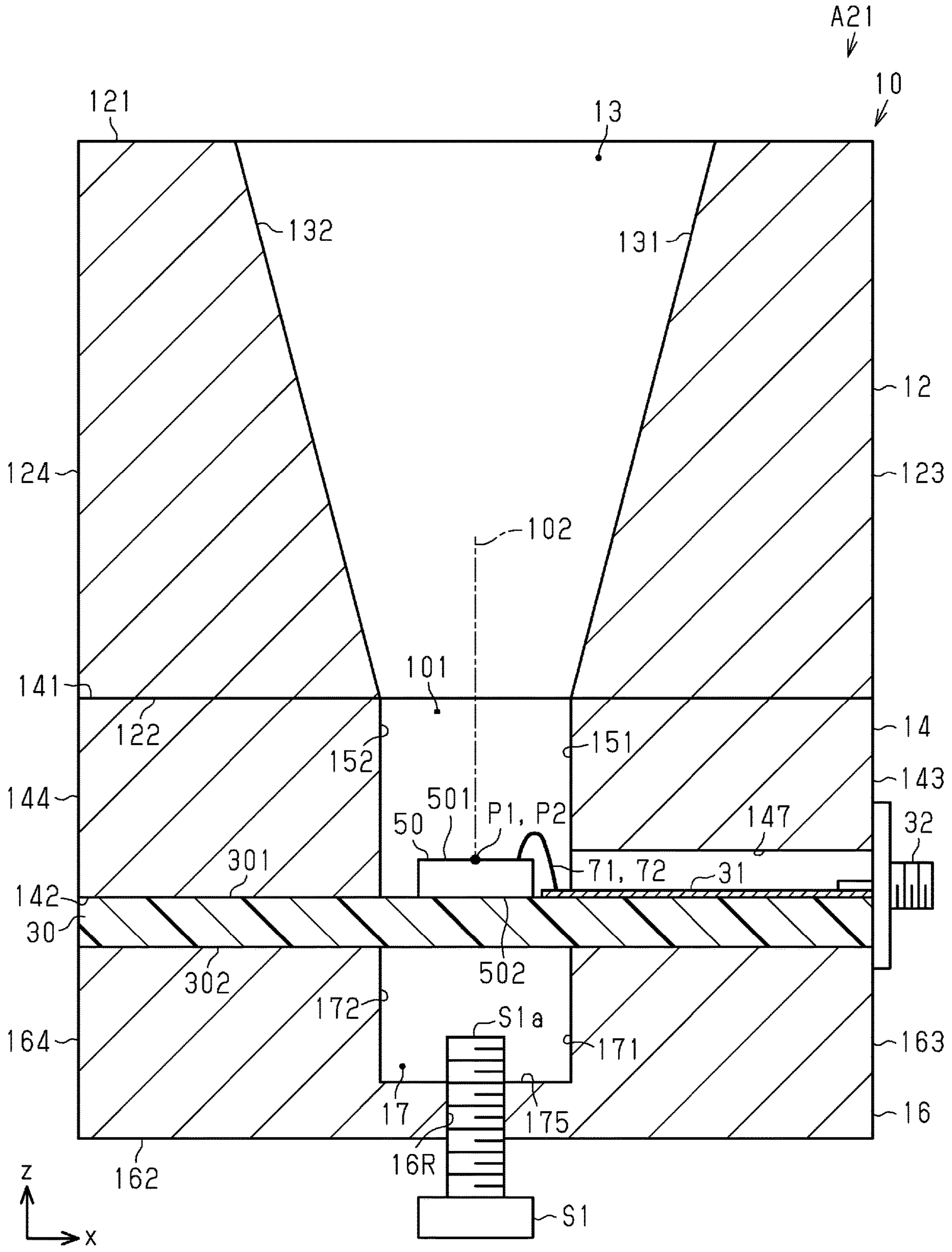
FIG. 29 is a cross-sectional front view showing a modified example of the terahertz device.

FIG. 29 shows a terahertz device A21 that allows the back short portion 17 of the short-circuit portion 16 to be changed in shape. The terahertz device A21 includes an adjustment member S1. The adjustment member S1 is, for example, a screw. In FIG. 29, a screw hole 16R extends through the short-circuit portion 16 between the bottom surface 175 of the back short portion 17 and the back surface 162. The adjustment member S1 is fastened to the screw hole 16R so that its distal end Sla is located in the back short portion 17.

The shape of the back short portion 17 can be adjusted by changing the position where the distal end Sla of the adjustment member S1 is located, that is, by changing the insertion state of the adjustment member S1. This allows for impedance adjustment.

Figure 30:
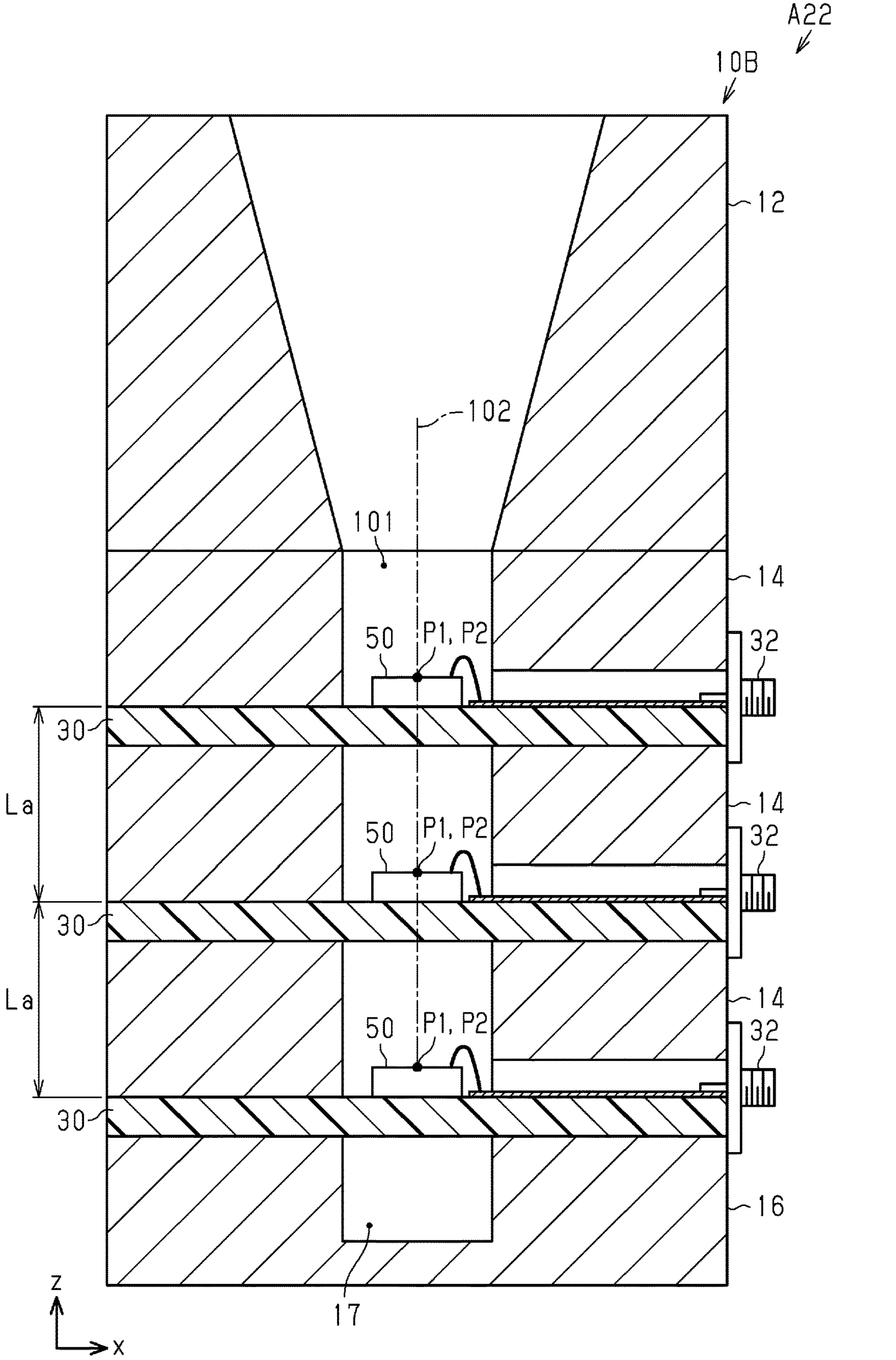
FIG. 30 is a cross-sectional front view showing a modified example of the terahertz device.

FIG. 30 shows a terahertz device A22 including a plurality of (three in FIG. 30) terahertz elements 50. Three main bodies 14 respectively corresponding to the three terahertz elements 50 are arranged in the transmission region of the waveguide 10B. A support substrate 30 is mounted on each terahertz element 50. The support substrates 30 are sandwiched between two corresponding ones of the three main bodies 14 and the single short-circuit portion 16. Preferably, in the terahertz device A22, the layout interval La of the terahertz elements 50 is an integer multiple of the wavelength λ of electromagnetic waves (where mλ, m are an integer of 1 or greater: m=1, 2, 3, . . . ). In this manner, the arrangement of a plurality of terahertz elements 50 increases the coupling efficiency between the terahertz elements 50 and obtains a high gain.

The waveguides 10, 10A, 10B in the above embodiments are quadrangular waveguides having rectangular transmission regions 101 but may be circular waveguides having circular transmission regions as viewed from the open side.

The terahertz element 50 may convert the incident electromagnetic waves in the terahertz band to electric energy. This will be described more specifically using the terahertz device A1 in accordance with the first embodiment. The active element 52 of the terahertz element 50 converts the incident electromagnetic waves in the terahertz band (terahertz waves) to electric energy. As a result, the terahertz element 50 receives terahertz waves with the antenna 55 and detects terahertz waves with the active element 52. Accordingly, the antenna 55 acts as a receiving point P2 that receives the electromagnetic waves and a generating point that acts to generate the electromagnetic waves. Thus, the terahertz element 50 includes the receiving point P2 and a detecting point P1 at the center of the element main surface 501. In this case, the power feed line 31 formed on the support substrate 30 functions as a transmission line that outputs the electric energy converted by the terahertz element 50 as an electric signal to the outside of the terahertz device A1.

Further, the terahertz element 50 may perform both generation and detection of terahertz waves, and the active element 52 may act as both of the generating point Pb and the detecting point P1. In this case, the power feed line 31 formed on the support substrate 30 functions as a line that provides a high-frequency electric signal to emit electromagnetic waves to the terahertz element 50, and as a transmission line that outputs the electric energy converted by the terahertz element 50 as an electric signal to the outside of the terahertz device A1.

The support substrate that supports the terahertz element may be changed in shape.

Figure 31:
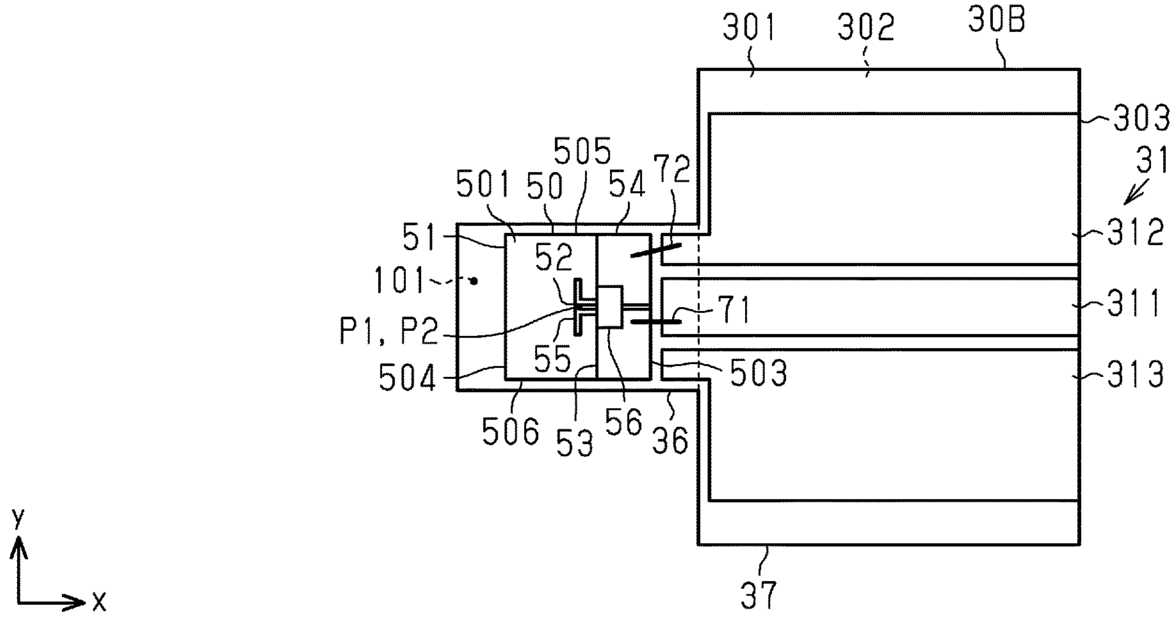
FIG. 31 is a plan view showing a modified example of the support substrate.

FIG. 31 shows a support substrate 30B including a support portion 36 and a fixing portion 37. The support portion 36 is sized in correspondence with the transmission region 101 of the waveguide, particularly, the shape and size of the transmission region 101, in a plane orthogonal to the transmission direction. The transmission region 101 is, for example, rectangular so that short side dimension b in the third direction y (refer to FIG. 4) is shorter than long side dimension a in the second direction x (refer to FIG. 4). Accordingly, the support portion 36 is rectangular so that the length in the third direction y is shorter than the length in the second direction x. The support portion 36 has a dimension in the second direction x that is long side dimension a and a dimension in the third direction that is short side dimension b. The terahertz element 50 is mounted on the support portion 36. The terahertz element 50 positions, for example, the emitting point P2 at the center of the support portion 36. The fixing portion 37 is connected to the support portion 36 in the second direction x. That is, the fixing portion 37 is connected to the rectangular support portion 36 in the direction in which the long sides of the support portion 36 extends. In other words, the fixing portion 37 is connected to the short side of the rectangular support portion 36. The terahertz element 50 mounted on the support portion 36 includes the antenna 55. The terahertz element 50 is arranged so that the direction in which the antenna 55 extends is the short-side direction of the transmission region 101. Accordingly, the fixing portion 37 is connected to the support portion 36 in a direction orthogonal to the extending direction of the antenna 55 of the terahertz element 50, which is mounted on the support portion 36.

Figure 32:
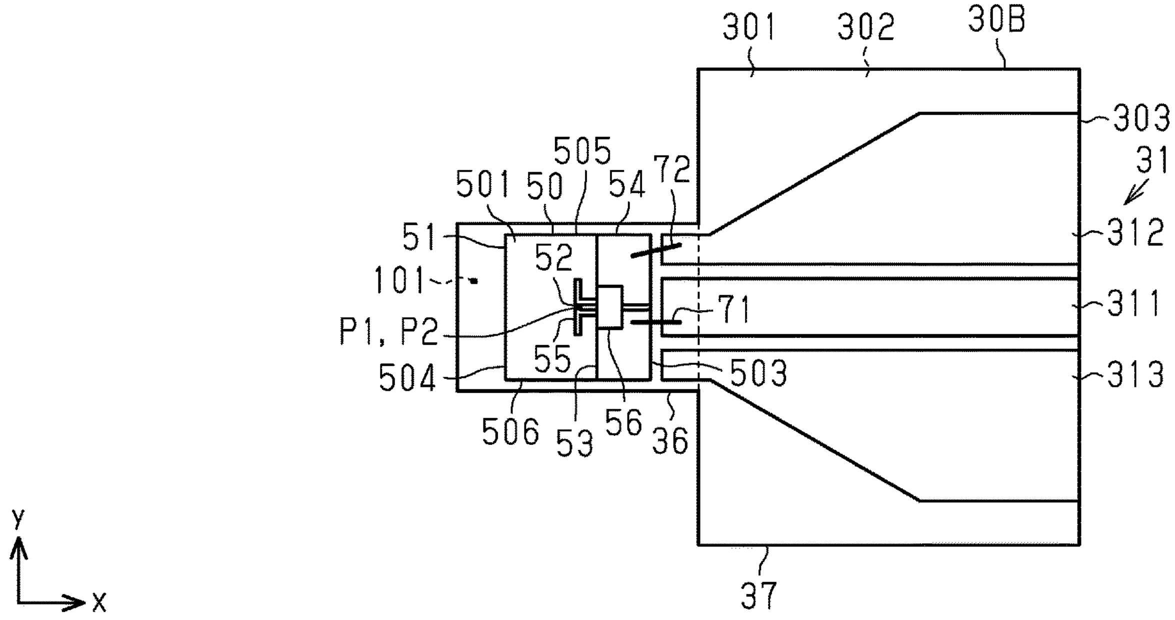
FIG. 32 is a plan view showing a modified example of the support substrate.

The fixing portion 37 is arranged between the main body of the waveguide and the short-circuit portion. When the support portion 36 has the size of the transmission region 101 and the fixing portion 37 is connected to the support portion 36 in the second direction x, the effect on the frequency characteristics can be minimized. When the support substrate extends out of the transmission region 101 in the third direction y (direction of dimension b of transmission region 101), unnecessary generation may occur. The occurrence of unnecessary generation will adversely affect the frequency characteristics. Outward extension of the support substrate in the second direction x will not affect the frequency characteristics. The arrangement of the fixing portion 37 in the second direction x allows the support portion 36 to be supported. The main conductor 311 of the power feed line 31 and the ground conductors 312 and 313 are shaped in correspondence with a connector connected to the power feed line 31. As shown in FIG. 32, the ground conductors 312 and 313 may be shaped to narrow toward the support portion 36.

Figure 33:
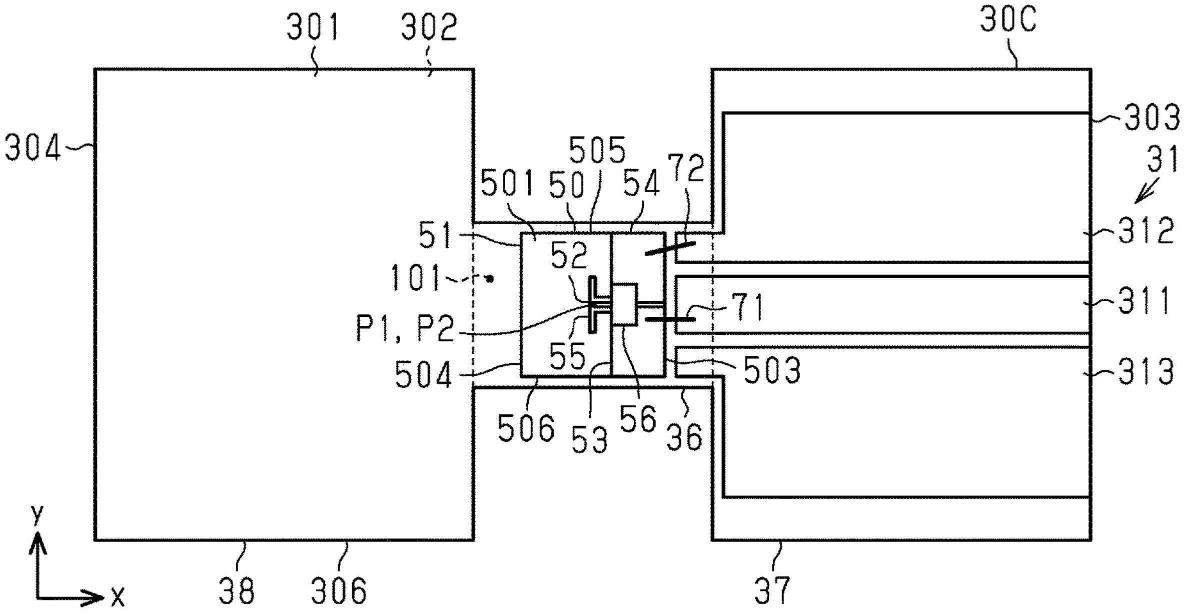
FIG. 33 is a plan view showing a modified example of the support substrate.
Figure 34:
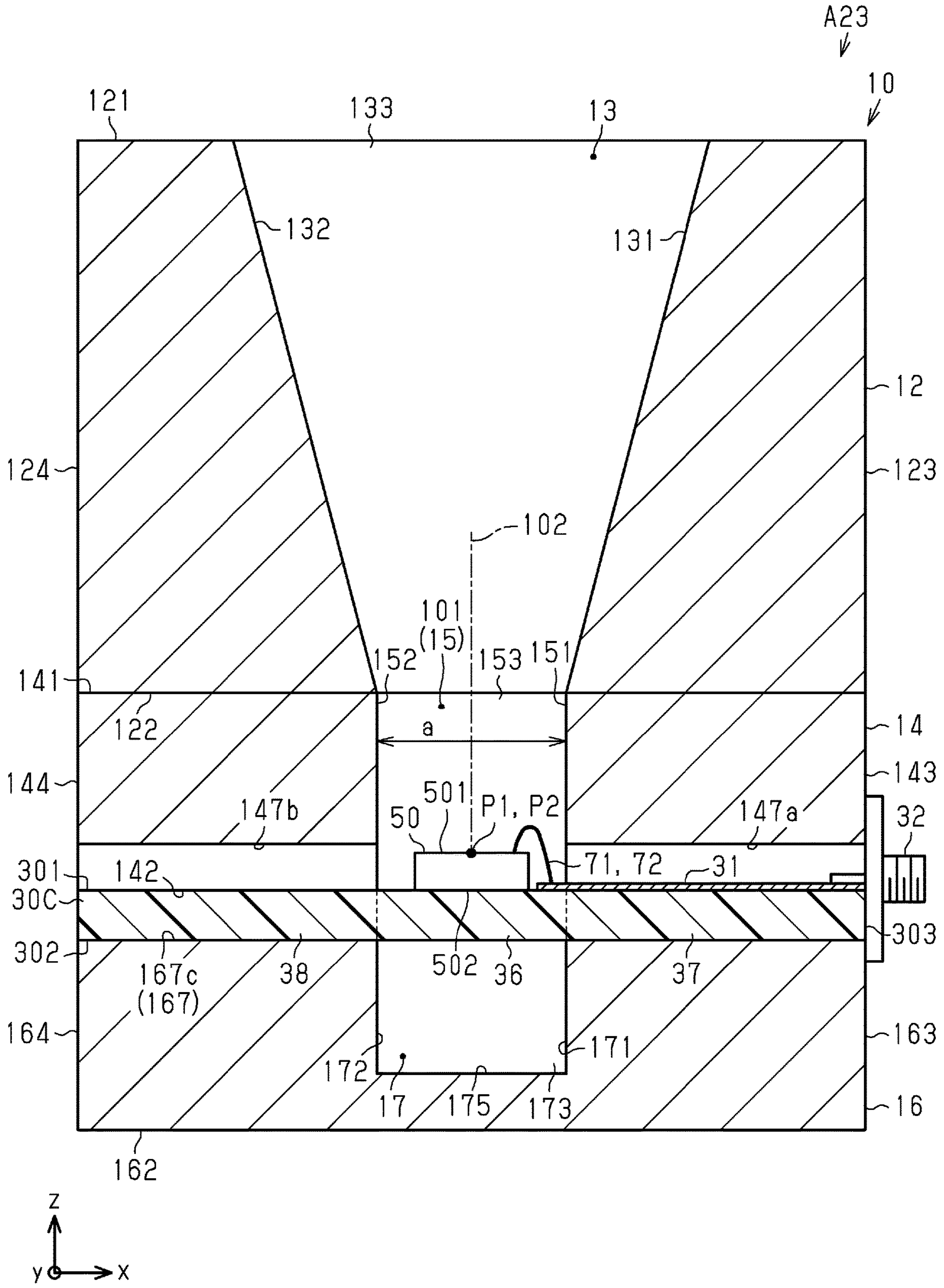
FIG. 34 is a cross-sectional front view showing a terahertz device including a modified example of the support substrate.

As shown in FIG. 33, the support substrate 30C includes a first fixing portion 37 and a second fixing portion 38. The first fixing portion 37 is connected to the support portion 36 in the second direction x. The second fixing portion 38 is connected to the support portion 36 at the side opposite to the first fixing portion 37. Preferably, the second fixing portion 38 has the same size as the power feed side fixing portion 37. The support substrate 30C results in the electric field distribution being uniform around the terahertz element 50 in the second direction x and further stabilizes the frequency characteristics. Preferably, with the support substrate 30C, like a terahertz device A23 shown in FIG. 34, the main body 14 includes a power feed side first groove 147*a* and an identically shaped second groove 147*b*. The arrangement of the first groove 147*a* and the second groove 147*b* allows the electric field distribution to be uniform in the second direction x and further stabilizes the frequency characteristics.

The generating point P1 and the emitting point P2 (detecting point P1 and receiving point P2) may be located at different positions. For example, the generating point P1 may be arranged between the antenna 55 (emitting point P2) and the first pad electrode 533 and second pad electrode 543,

EMBODIMENTS

Technical concepts that can be understood from each of the above embodiments and modified examples will now be described.

Embodiment 1

A terahertz device including:

a terahertz element that generates and emits electromagnetic waves in a terahertz band; and a waveguide including a transmission region that transmits the electromagnetic waves, where:

the terahertz element includes an element main surface and an element back surface that face opposite directions, and the element main surface includes a generating point that generates the electromagnetic waves and an emitting point that emits the electromagnetic waves; and the terahertz element is arranged so that the generating point and the emitting point are located in the transmission region.

Embodiment 2

The terahertz device according to embodiment 1, where the terahertz element is arranged so that the emitting point is located in a center of the transmission region.

Embodiment 3

The terahertz device according to embodiment 1 or 2, where the terahertz element includes an active element that converts the electromagnetic waves into electric energy at the generating point.

Embodiment 4

The terahertz device according to embodiment 3, where the terahertz element includes an antenna connected to the active element to emit the electromagnetic waves in a direction orthogonal to the element main surface.

Embodiment 5

The terahertz device according to embodiment 3, where the terahertz element includes an antenna connected to the active element to emit the electromagnetic waves in a direction parallel to the element main surface.

Embodiment 6

A terahertz device including:

a waveguide including a transmission region that transmits electromagnetic waves in a terahertz band; and a terahertz element that receives and detects the electromagnetic waves, where:

the terahertz element includes an element main surface and an element back surface that face opposite directions, and the element main surface includes a receiving point that receives the electromagnetic waves and a detecting point that detects the electromagnetic waves; and the terahertz element is arranged so that the receiving point and the detecting point are located in the transmission region.

Embodiment 7

The terahertz device according to embodiment 6, where the terahertz element is arranged so that the receiving point is located in a center of the transmission region.

Embodiment 8

The terahertz device according to embodiment 6 or 7, where the terahertz element includes an active element that converts the electromagnetic waves into electric energy at the detecting point.

Embodiment 9

The terahertz device according to embodiment 8, where the terahertz element includes an antenna connected to the active element to receive the electromagnetic waves in a direction orthogonal to the element main surface.

Embodiment 10

The terahertz device according to embodiment 8, where the terahertz element includes an antenna connected to the active element to receive the electromagnetic waves in a direction parallel to the element main surface.

Embodiment 11

The terahertz device according to any one of embodiments 3 to 5 and 8 to 10, where the active element is any one of a resonant tunneling diode, a tunnel injection transit time diode, an impact ionization avalanche transit time diode, a GaAs field effect transistor, a GaN field effect transistor, a high electron mobility transistor, and a heterojunction bipolar transistor.

Embodiment 12

The terahertz device according to embodiment 4 or 9, where the antenna is one of a dipole antenna, a bowtie antenna, a slot antenna, a patch antenna, and a ring antenna.

Embodiment 13

The terahertz device according to embodiment 5 or 10, where the antenna is one of a tapered slot antenna, a Yagi-Uda antenna, a bowtie antenna, and a dipole antenna.

Embodiment 14

The terahertz device according to any one of embodiments 1 to 13, including:

a support substrate that supports the terahertz element and includes a substrate main surface facing the transmission region and a substrate back surface at a side opposite to the substrate main surface, where the terahertz element is mounted on the substrate main surface.

Embodiment 15

The terahertz device according to any one of embodiments 1 to 13, including:

a support substrate that supports the terahertz element and includes a substrate main surface facing the transmission region and a substrate back surface facing a direction opposite to the substrate main surface, where the terahertz element is mounted on the substrate back surface.

Embodiment 16

The terahertz device according to embodiment 14 or 15, where the support substrate includes a transmission line connected to the terahertz element.

Embodiment 17

The terahertz device according to embodiment 16, where:

the transmission line includes a main conductor connected to the terahertz element; and the waveguide includes a groove surrounding the main conductor and extending along the main conductor on a surface of the support substrate where the main conductor is located.

Embodiment 18

The terahertz device according to embodiment 17, where:

the support substrate includes a support portion that supports the terahertz element and is located in the transmission region and a fixing portion that fixes the support portion to the waveguide; and the support portion is sized in correspondence with the transmission region of the waveguide.

Embodiment 19

The terahertz device according to embodiment 18, where:

a transmission direction in which the electromagnetic waves are transmitted in the waveguide is referred to as a first direction, a second direction is orthogonal to the first direction, and a third direction is orthogonal to the transmission direction and the second direction;

the support portion is rectangular and has a shorter dimension in the third direction than in the second direction; and the fixing portion is connected to the support in the second direction.

Embodiment 20

The terahertz device according to embodiment 19, where the fixing portion includes a first fixing portion and a second fixing portion, the first fixing portion is connected to the support portion in the second direction, and the second fixing portion is connected to the support portion at a side opposite to the first fixing portion.

Embodiment 21

The terahertz device according to embodiment 20, where:

the transmission line is arranged in the first fixing portion;

the groove is a first groove arranged in the first fixing portion; and the waveguide includes a second groove, shaped identically to the first groove, in the second fixing portion.

Embodiment 22

The terahertz device according to any one of embodiments 16 to 21, where the terahertz element is connected to the transmission line by a wire.

Embodiment 23

The terahertz device according to embodiment 22, where the support substrate includes an element accommodation recess that accommodates at least part of the terahertz element.

Embodiment 24

The terahertz device according to any one of embodiments 16 to 21, where the terahertz element is connected to the transmission line by a bump.

Embodiment 25

The terahertz device according to any one of embodiments 16 to 24, where the transmission line is one of a coplanar line, a microstrip line, a strip line, and a slot line.

Embodiment 26

The terahertz device according to embodiment 14, including a reflector on the element back surface of the terahertz element to reflect the electromagnetic waves.

Embodiment 27

The terahertz device according to embodiment 26, where:

the waveguide includes a main body that forms the transmission region and a short-circuit portion that short-circuits one end of the transmission region; and the reflector is a bottom surface of a recess formed in the short-circuit portion.

Embodiment 28

The terahertz device according to embodiment 26, where:

the waveguide includes a main body that forms the transmission region and a short-circuit portion that short-circuits one end of the transmission region; and the reflector is a short-circuit portion that contacts the substrate back surface of the support substrate.

Embodiment 29

The terahertz device according to embodiment 26, where the reflector is a reflective film formed on the substrate back surface of the support substrate.

Embodiment 30

The terahertz device according to embodiment 26, where the reflector is a reflective film formed on the substrate back surface of the support substrate.

Embodiment 31

The terahertz device according to embodiment 26, where the reflector is a reflective film formed on the element back surface of the terahertz element.

Embodiment 32

The terahertz device according to any one of embodiments 26 to 31, where the waveguide includes a main body that includes the transmission region and a short-circuit portion that includes a back short portion on the substrate back surface of the support substrate.

Embodiment 33

The terahertz device according to embodiment 32, where the back short portion is filled with a dielectric body.

Embodiment 34

The terahertz device according to embodiment 32 or 33, where the back short portion includes a slit.

Embodiment 35

The terahertz device according to any one of embodiments 32 to 34, where the short-circuit portion includes an adjustment member having a distal end inserted into the back short portion from a back surface at a side opposite to the support substrate.

Embodiment 36

The terahertz device according to any one of embodiments 1 to 35, where the waveguide includes an element accommodation portion that is enlarged from the transmission region and accommodates the terahertz element that is larger than the transmission region.

Embodiment 37

The terahertz device according to embodiment 36, where the element accommodation portion includes a side surface that is inclined so that a center of the transmission region becomes closer as the transmission region becomes closer.

REFERENCE SIGNS LIST

A1, A2, A3, A11-A22) terahertz device
10, 10A, 10B) waveguide
101) transmission region
102) center line
30, 30A, 30B, 30C) support substrate
301) substrate main surface
302) substrate back surface
31) power feed line
33, 34) reflective film
35) element accommodation recess
36) support portion
37) fixing portion (first fixing portion)
38) second fixing portion
40) transmission line
50, 50A) terahertz element
501) element main surface
502) element back surface
51) element substrate
52) active element
53) first conductor layer
531) first conductive portion
54) second conductor layer
541) second conductive portion
55, 55A) antenna
P1) generating point, detecting point
P2) emitting point, receiving point
x) second direction
y) third direction
z) first direction (transmission direction)

The invention claimed is:

1. A terahertz device comprising:
a terahertz element that generates and emits electromagnetic waves in a terahertz band; and
a waveguide including a transmission region that transmits the electromagnetic waves, wherein:
the terahertz element includes an element main surface and an element back surface that face opposite directions, and the element main surface includes a generating point that generates the electromagnetic waves and an emitting point that emits the electromagnetic waves; and
the terahertz element is arranged so that the generating point and the emitting point are located in the transmission region.

2. The terahertz device according to claim 1, wherein the terahertz element is arranged so that the emitting point is located in a center of the transmission region.

3. The terahertz device according to claim 1, wherein the terahertz element includes an active element that converts the electromagnetic waves into electric energy at the generating point.

4. The terahertz device according to claim 3, wherein the terahertz element includes an antenna connected to the active element to emit the electromagnetic waves in a direction orthogonal to the element main surface.

5. The terahertz device according to claim 3, wherein the terahertz element includes an antenna connected to the active element to emit the electromagnetic waves in a direction parallel to the element main surface.

6. The terahertz device according to claim 3, wherein the active element is any one of a resonant tunneling diode, a tunnel injection transit time diode, an impact ionization avalanche transit time diode, a GaAs field effect transistor, a GaN field effect transistor, a high electron mobility transistor, and a heterojunction bipolar transistor.

7. The terahertz device according to claim 4, wherein the antenna is one of a dipole antenna, a bowtie antenna, a slot antenna, a patch antenna, and a ring antenna.

8. The terahertz device according to claim 5, wherein the antenna is one of a tapered slot antenna, a Yagi-Uda antenna, a bowtie antenna, and a dipole antenna.

9. The terahertz device according to claim 1, comprising:
a support substrate that supports the terahertz element and includes a substrate main surface facing the transmission region and a substrate back surface facing a direction opposite to the substrate main surface,
wherein the terahertz element is mounted on the substrate main surface.

10. The terahertz device according to claim 1, comprising:
a support substrate that supports the terahertz element and includes a substrate main surface facing the transmission region and a substrate back surface facing a direction opposite to the substrate main surface,
wherein the terahertz element is mounted on the substrate back surface.

11. The terahertz device according to claim 9, wherein the support substrate includes a transmission line connected to the terahertz element.

12. The terahertz device according to claim 11, wherein:

the transmission line includes a main conductor connected to the terahertz element; and the waveguide includes a groove surrounding the main conductor and extending along the main conductor on a surface of the support substrate where the main conductor is located.

13. The terahertz device according to claim 12, wherein:

the support substrate includes a support portion that supports the terahertz element and is located in the transmission region and a fixing portion that fixes the support to the waveguide; and the support portion is sized in correspondence with the transmission region of the waveguide.

14. The terahertz device according to claim 13, wherein:

a transmission direction in which the electromagnetic waves are transmitted in the waveguide is referred to as a first direction, a second direction is orthogonal to the first direction, and a third direction is orthogonal to the transmission direction and the second direction;

the support portion is rectangular and has a shorter dimension in the third direction than in the second direction; and the fixing portion is connected to the support portion in the second direction.

15. The terahertz device according to claim 14, wherein the fixing portion includes a first fixing portion and a second fixing portion, the first fixing portion is connected to the support portion in the second direction, and the second fixing portion is connected to the support portion at a side opposite to the first fixing portion.

* * * * *